(12) United States Patent
Solis et al.

(10) Patent No.: US 10,899,113 B2
(45) Date of Patent: Jan. 26, 2021

(54) MULTILAYER CAST FILMS WITH REDUCED BLOCKING AND METHODS OF MAKING SAME

(71) Applicant: Chevron Phillips Chemical Company LP, The Woodlands, TX (US)

(72) Inventors: James A. Solis, Owasso, OK (US); Lawrence Szmutko, Bartlesville, OK (US); Charles D. Mills, Montgomery, TX (US); Jung-Kwang D. Kang, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 246 days.

(21) Appl. No.: 15/385,962

(22) Filed: Dec. 21, 2016

(65) Prior Publication Data

US 2018/0170015 A1   Jun. 21, 2018

(51) Int. Cl.
*B32B 1/02* (2006.01)
*B32B 27/08* (2006.01)
(Continued)

(52) U.S. Cl.
CPC ............ *B32B 27/08* (2013.01); *B29C 48/022* (2019.02); *B29C 48/08* (2019.02); *B29C 48/21* (2019.02); *B32B 27/18* (2013.01); *B32B 27/20* (2013.01); *B32B 27/32* (2013.01); *B29K 2023/0633* (2013.01); *B29K 2023/08* (2013.01); *B29K 2995/0017* (2013.01); *B29K 2995/0063* (2013.01); *B29K 2995/0082* (2013.01); *B29L 2031/7128* (2013.01); *B32B 27/16* (2013.01); *B32B 27/327* (2013.01); *B32B 2250/03* (2013.01); *B32B 2250/05* (2013.01); *B32B 2250/24* (2013.01); *B32B 2250/242* (2013.01); *B32B 2250/40* (2013.01); *B32B 2270/00* (2013.01); *B32B 2307/30* (2013.01);
(Continued)

(58) Field of Classification Search
CPC   B32B 1/02; B32B 27/08; B32B 27/18; B32B 27/20; B32B 27/32; B32B 27/16; B32B 27/327; Y10T 428/1352
See application file for complete search history.

(56) References Cited

U.S. PATENT DOCUMENTS

| 4,578,316 A | 3/1986 | Clauson et al. |
| 5,206,075 A | 4/1993 | Hodgson, Jr. |

(Continued)

FOREIGN PATENT DOCUMENTS

WO   WO 2013/151687   10/2013

OTHER PUBLICATIONS

*Film Extrusion Manual—Process, Materials, Properties*, TAPPI Press, 1992, 16 pages.

(Continued)

*Primary Examiner* — Marc A Patterson
(74) *Attorney, Agent, or Firm* — Merchant & Gould P.C.

(57) ABSTRACT

Multilayer cast films with an ethylene/α-olefin copolymer core layer, and inner and outer layers containing low density polyethylene homopolymers, and multilayer cast films with an ethylene polymer core layer, and inner and outer layers containing ethylene/α-olefin copolymers, are described. These cast films have a reduced tendency to block, and are useful in various food packaging applications.

11 Claims, 3 Drawing Sheets

Multilayer Cast Film Structure

| Inner Layer |
| Core Layer |
| Outer Layer |

(51) Int. Cl.
  *B32B 27/20* (2006.01)
  *B32B 27/18* (2006.01)
  *B32B 27/32* (2006.01)
  *B29C 48/08* (2019.01)
  *B29C 48/21* (2019.01)
  *B29C 48/00* (2019.01)
  *B29L 31/00* (2006.01)
  *B29K 23/00* (2006.01)
  *B32B 27/16* (2006.01)

(52) U.S. Cl.
  CPC ... *B32B 2307/308* (2013.01); *B32B 2307/406* (2013.01); *B32B 2307/412* (2013.01); *B32B 2307/546* (2013.01); *B32B 2307/558* (2013.01); *B32B 2307/5825* (2013.01); *B32B 2307/72* (2013.01); *B32B 2307/746* (2013.01); *B32B 2307/75* (2013.01); *B32B 2439/46* (2013.01); *B32B 2439/70* (2013.01)

(56) References Cited

U.S. PATENT DOCUMENTS

| | | | | |
|---|---|---|---|---|
| 5,420,220 | A * | 5/1995 | Cheruvu | C08F 10/02 428/402 |
| 6,495,266 | B1 * | 12/2002 | Migliorini | B32B 27/32 428/461 |
| 2004/0077810 | A1 * | 4/2004 | Marechal | B32B 27/32 526/183 |
| 2007/0020472 | A1 * | 1/2007 | Mills | B32B 27/18 428/515 |
| 2007/0260016 | A1 * | 11/2007 | Best | B32B 27/32 525/240 |
| 2009/0297810 | A1 * | 12/2009 | Fiscus | B32B 27/32 428/220 |
| 2012/0202942 | A1 * | 8/2012 | Mavridis | C08J 5/18 524/528 |
| 2013/0059140 | A1 | 3/2013 | Hlavinka et al. | |
| 2013/0309426 | A1 | 11/2013 | Thai et al. | |
| 2014/0346714 | A1 | 11/2014 | Pettey et al. | |
| 2015/0225520 | A1 * | 8/2015 | Bensason | C08F 210/16 526/348.1 |

OTHER PUBLICATIONS

ExxonMobil Chemical Company article, entitled "New Enable Metallocene Polyethylene Combines Enhanced Extrusion with Excellent Film Performance," PlasticsNet, 2008, 2 pages.

Laurent, entitled "Emerging Trends in PE Film Market and Innovative Solutions," ExxonMobil Chemical Flexible Film and Bag Conference, 2012, pp. 1-20.

*Modern Plastics Encyclopedia*, Mid-November 1995 Issue, vol. 72, No. 12, 3 pages.

Vigano, Simone, entitled "*The Use of Metallocene Polyethylene in Co-Extruded Lamination Film*," ExxonMobil Chemical Europe, 2007, pp. 1-9.

International Search Report and the Written Opinion of the International Searching Authority in PCT/US2017/065012 dated Jan. 29, 2018.

* cited by examiner

FIG. 1

Multilayer Cast Film Structure

| Inner Layer |
|---|
| Core Layer |
| Outer Layer |

FIG. 2

Multilayer Cast Film Structure

| Inner Layer |
|---|
| Core Layer |
| Miscellaneous Layer |
| Outer Layer |

FIG. 3

Multilayer Cast Film Structure

| Inner Layer |
|---|
| Miscellaneous Layer |
| Core Layer |
| Miscellaneous Layer |
| Outer Layer |

FIG. 4

Multilayer Cast Film Structure

| Inner Layer |
|---|
| Miscellaneous Layer |
| Miscellaneous Layer |
| Core Layer |
| Miscellaneous Layer |
| Miscellaneous Layer |
| Outer Layer |

MULTILAYER CAST FILMS WITH REDUCED BLOCKING AND METHODS OF MAKING SAME

FIELD OF THE INVENTION

The present disclosure relates generally to multilayer cast films with a reduced tendency for blocking. These multilayer cast films can be used in food packaging applications, such as bakery and bread bags.

BACKGROUND OF THE INVENTION

Multilayer cast films used in packaging as either single sheets to wrap products, or converted into bags into which products are loaded, often must meet requirements including excellent optical properties (high clarity and gloss, and low haze), excellent mechanical properties (high dart impact, Elmendorf tear, and PPT tear strength), and low frictional properties (low film-to-film and film-to-metal COF). Since packaging processes typically involve automated mechanical methods that can include the high-speed moving, positioning, and opening of the multilayer cast film in preparation for wrapping or loading of the product, another property critical to the performance of cast films in the packaging process is the degree to which the adjacent film surfaces adhere to each other. The term used to describe the magnitude of adherence of adjacent film surfaces is "blocking." A high level of blocking means that adjacent film surfaces tend to adhere to one another or to other surfaces. Conversely, low blocking means that adjacent film surfaces do not easily adhere to one another or to other surfaces. High levels of film blocking can slow or interrupt the packaging process and, therefore, are considered undesirable.

Thus, a need exists for multilayer cast films with reduced tendency to block, while maintaining the desired optical, mechanical, and COF properties for the end-use application. Accordingly, it is to these ends that the present disclosure is principally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

An aspect of this invention is directed to a multilayer cast film, and in this aspect, the multilayer cast film can comprise (a) a core layer having a first side and a second side, the core layer comprising an ethylene/α-olefin copolymer, (b) an inner layer positioned on the first side of the core layer, the inner layer comprising a first low density polyethylene homopolymer, and (c) an outer layer positioned on the second side of the core layer, the outer layer comprising a second low density polyethylene homopolymer. The ethylene/α-olefin copolymer can be characterized by a melt index in a range from about 2 to about 12 g/10 min, a density in a range from about 0.91 to about 0.95 g/cm$^3$, and a ratio of Mw/Mn in a range from about 2 to about 3.5. These multilayer cast films can have three or more layers, and due to the presence of the specified ethylene/α-olefin copolymer in the core layer, these multilayer cast films can have improved properties, such as reduced blocking, as compared to similar films that use broader molecular weight distribution copolymers, such as can be produced with Ziegler-Natta catalyst systems.

Another aspect of this invention is directed to a process for producing a multilayer cast film having a reduced blocking force, and in this aspect, the process can comprise (i) introducing a coextruded flow into a cast film coextrusion die, the coextruded flow comprising (a) a core layer flow having a first side and a second side, the core layer flow comprising an ethylene/α-olefin copolymer, (b) an inner layer flow positioned on the first side of the core layer flow, the inner layer flow comprising a first low density polyethylene homopolymer, and (c) an outer layer flow positioned on the second side of the core layer flow, the outer layer flow comprising a second low density polyethylene homopolymer; and (ii) drawing down the coextruded flow exiting the cast film coextrusion die to produce the multilayer cast film. The ethylene/α-olefin copolymer can be characterized by a melt index in a range from about 2 to about 12 g/10 min, a density in a range from about 0.91 to about 0.95 g/cm$^3$, and a ratio of Mw/Mn in a range from about 2 to about 3.5. The cast film can have a reduced blocking force, for example, a blocking force at 125° F. of less than or equal to about 60 g.

In yet another aspect of this invention, a multilayer cast film is provided, and in this aspect, the multilayer cast film can comprise (a) a core layer having a first side and a second side, the core layer comprising an ethylene polymer, (b) an inner layer positioned on the first side of the core layer, the inner layer comprising a first ethylene/α-olefin copolymer, and (c) an outer layer positioned on the second side of the core layer, the outer layer comprising a second ethylene/α-olefin copolymer. The first ethylene/α-olefin copolymer and the second ethylene/α-olefin copolymer are the same or different, and can be characterized by a melt index in a range from about 0.5 to about 12 g/10 min, a density in a range from about 0.925 to about 0.94 g/cm$^3$, and a ratio of Mw/Mn in a range from about 2 to about 3.5. These multilayer cast films can have three or more layers, and due to the presence of the specified ethylene/α-olefin copolymers in the inner layer and the outer layer, these multilayer cast films can have improved properties, such as reduced blocking, as compared to similar films that use low density polyethylene homopolymers in the inner layer and the outer layer.

In still another aspect of this invention, a process for producing a multilayer cast film having a reduced blocking force is provided, and in this aspect, the process can comprise (i) introducing a coextruded flow into a cast film coextrusion die, the coextruded flow comprising (a) a core layer flow having a first side and a second side, the core layer flow comprising an ethylene polymer, (b) an inner layer flow positioned on the first side of the core layer flow, the inner layer flow comprising a first ethylene/α-olefin copolymer, and (c) an outer layer flow positioned on the second side of the core layer flow, the outer layer flow comprising a second ethylene/α-olefin copolymer; and (ii) drawing down the coextruded flow exiting the cast film coextrusion die to produce the multilayer cast film. The first ethylene/α-olefin copolymer and the second ethylene/α-olefin copolymer are the same or different, and can be characterized by a melt index in a range from about 0.5 to about 12 g/10 min, a density in a range from about 0.925 to about 0.94 g/cm$^3$, and a ratio of Mw/Mn in a range from about 2 to about 3.5. The cast film can have a reduced blocking force, for example, a blocking force at 125° F. of less than or equal to about 60 g.

Both the foregoing summary and the following detailed description provide examples and are explanatory only. Accordingly, the foregoing summary and the following detailed description should not be considered to be restrictive. Further, features or variations can be provided in addition to those set forth herein. For example, certain aspects can be directed to various feature combinations and sub-combinations described in the detailed description.

BRIEF DESCRIPTION OF THE FIGURES

FIG. 1 presents an illustration of a 3-layer cast film structure according to an aspect of the present invention.

FIG. 2 presents an illustration of a 4-layer cast film structure according to an aspect of the present invention.

FIG. 3 presents an illustration of a 5-layer cast film structure according to an aspect of the present invention.

FIG. 4 presents an illustration of a 7-layer cast film structure according to an aspect of the present invention.

DEFINITIONS

Figure 5:
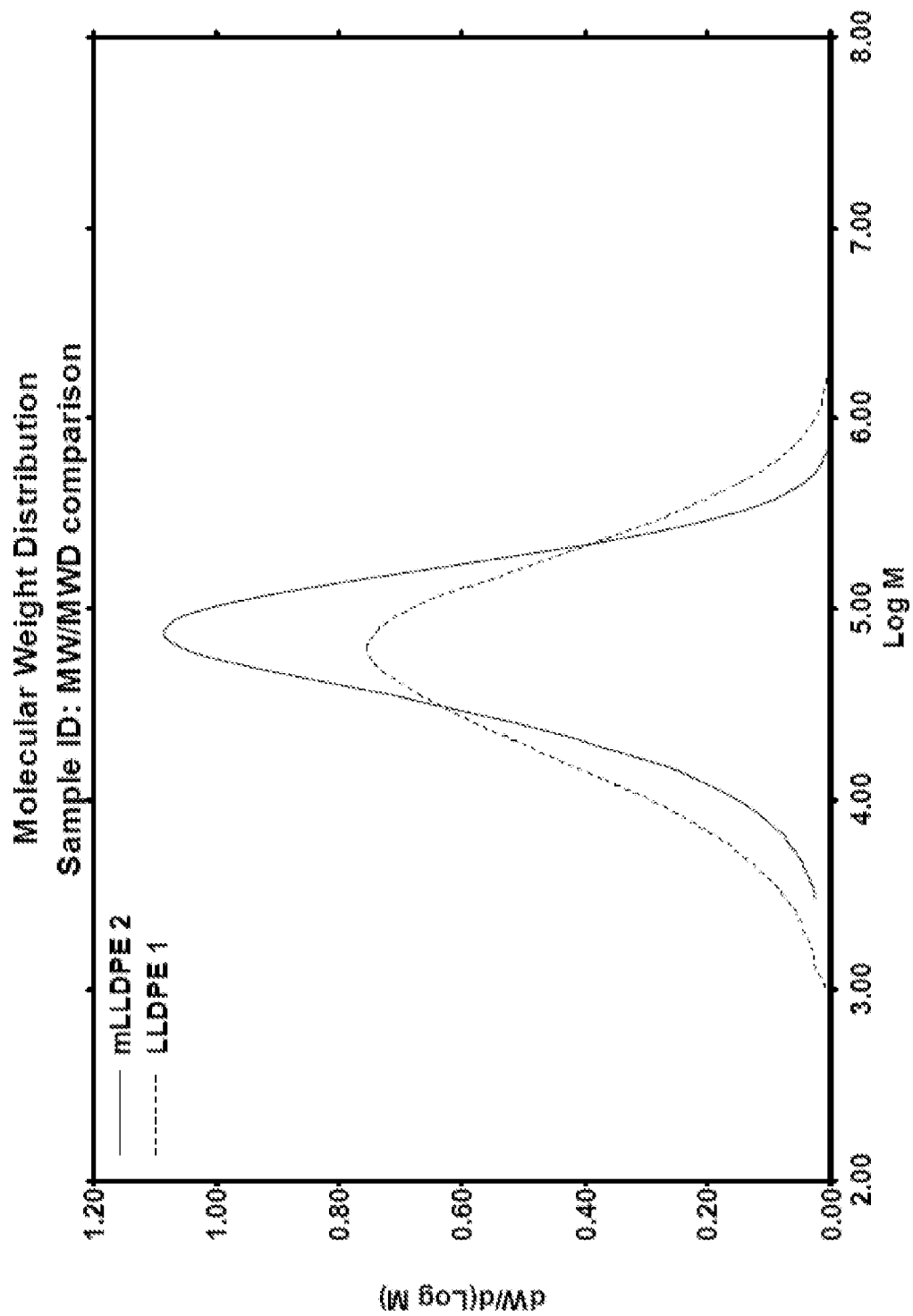
FIG. 5 presents a plot of the molecular weight distributions of LLDPE 1 and mLLDPE 2.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the designs, compositions, processes, or methods described herein are contemplated with or without explicit description of the particular combination. Additionally, unless explicitly recited otherwise, any aspect or feature disclosed herein can be combined to describe inventive designs, compositions, processes, or methods consistent with the present disclosure.

In this disclosure, while compositions and methods are often described in terms of "comprising" various components or steps, the compositions and methods can also "consist essentially of" or "consist of" the various components or steps, unless stated otherwise. For example, a multilayer cast film consistent with aspects of the present invention can comprise; alternatively, can consist essentially of; or alternatively, can consist of; a core layer, an inner layer, and an outer layer.

The terms "a," "an," and "the" are intended to include plural alternatives, e.g., at least one, unless otherwise specified. For instance, the disclosure of "an ethylene polymer" or "a LDPE homopolymer," is meant to encompass one, or mixtures or combinations of more than one, ethylene polymer or LDPE homopolymer, unless otherwise specified.

The term "polymer" is used herein generically to include olefin homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers and terpolymers derived from any olefin monomer and comonomer(s) disclosed herein. Similarly, the scope of the term "polymerization" includes homopolymerization, copolymerization, and terpolymerization. Therefore, an ethylene polymer includes ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, if present and unless stated otherwise, and such configurations can include isotactic, syndiotactic, and random symmetries.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which can be used in connection with the presently described invention.

Various numerical ranges are disclosed herein. When a range of any type is disclosed or claimed herein, the intent is to disclose or claim individually each possible number that such a range could reasonably encompass, including end points of the range as well as any sub-ranges and combinations of sub-ranges encompassed therein, unless otherwise specified. As a representative example, the present application discloses that an ethylene/α-olefin copolymer can have, in certain aspects, a melt index from about 2 to about 12 g/10 min. By a disclosure that the melt index of the ethylene/α-olefin copolymer can be in a range from about 2 to about 12 g/10 min, the intent is to recite that the melt index can be any melt index within the range and, for example, can be equal to about 2, about 3, about 4, about 5, about 6, about 7, about 8, about 9, about 10, about 11, or about 12 g/10 min. Additionally, the melt index can be within any range from about 2 to about 12 g/10 min (for example, the melt index can be in a range about 3 to about 6 g/10 min), and this also includes any combination of ranges between about 2 and about 12 g/10 min. Likewise, all other ranges disclosed herein should be interpreted in a manner similar to this example.

The term "about" means that amounts, sizes, formulations, parameters, and other quantities and characteristics are not and need not be exact, but may be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

As used herein, "MD" refers to machine direction, and "CD" refers to cross direction. The cross direction also can be referred to herein as the transverse direction (TD).

Various physical properties of multilayer cast films, as well as of the polymeric components that are used to form these films, are discussed throughout this disclosure. Following is a listing of physical properties and their corresponding analytical test procedures and conditions:

Melt index (MI, g/10 min) was determined in accordance with ASTM D1238 at 190° C. with a 2,160 gram weight. Polymer density was determined in grams per cubic centimeter ($g/cm^3$) on a compression molded samples, cooled at about 15° C. per hour, and conditioned for 15 minutes before testing in accordance with ASTM D1505 or ASTM D4703.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 200 µL was used. The integral calibration method was used to deduce molecular weights and molecular weight distributions using a Chevron Phillips Chemical Company's HDPE polyethylene resin, MARLEX® BHB5003, as the standard. The integral table of the standard was pre-determined in a separate experiment with SEC-MALS. $Mn$ is the number-average molecular weight, $Mw$ is the weight-average molecular weight, $Mz$ is the z-average molecular weight, and $Mp$ is the peak molecular weight (location, in molecular weight, of the highest point of the molecular weight distribution curve).

Hexane extractables (wt. %) and xylene solubles (wt. %) were determined in accordance with 21 CFR 177.1520.

Dart impact strength (g/mil) was measured in accordance with ASTM D1709 (method A). Machine direction (MD) and transverse direction (TD) Elmendorf tear strengths (g/mil) were measured on a Testing Machines tear tester (Model 83-11-00) in accordance with ASTM D1922. Puncture propagation tear (PPT, lb) was determined in accordance with ASTM D2582. Film Haze (%) was determined in accordance with ASTM D1003, and 45° Gloss and 60° Gloss were determined in accordance with ASTM D523.

Film yield strength (psi), tensile strength at break (psi), elongation at break (%), and 1% secant modulus (psi) were determined in accordance with ASTM D882. Seal initiation temperature (° C.) and seal strength (lb/in) were determined in accordance with ASTM F88.

Coefficient of friction (COF, film-to-film) was determined in accordance with ASTM D1894. Surface treatment or dyne level ($dyne/cm^2$) was determined with ACCUDYNE™ test marker pens in a method consistent with ASTM D2578. The blocking force (g) at various temperatures was determined in accordance with ASTM D3354.

DETAILED DESCRIPTION OF THE INVENTION

Disclosed herein are multilayer cast films with low levels of blocking. One aspect of this invention is generally directed to multilayer cast films with a core layer containing a narrow molecular weight distribution ethylene/α-olefin copolymer, and inner and outer layers containing LDPE. Another aspect of this invention is generally directed to a multilayer cast film with an ethylene polymer core layer, and inner and outer layers containing narrow molecular weight distribution ethylene/α-olefin copolymers.

A typical multilayer cast film that has been found to exhibit a strong tendency to block has a traditional LLDPE core layer (with a broad molecular weight distribution), and inner and outer layers containing LDPE for good optical properties. The presence of LLDPE enables good "drawdown" of the film at high extrusion rates (eliminating holes and tears) and provides acceptable mechanical properties, and the melt index and density of the LLDPE are often selected for cast film processing and to match the rheology of the LDPE, and to maintain equivalent stiffness (e.g., secant modulus).

While not wishing to be bound by the following theory, it is believed that cast films that incorporate high levels of traditional LLDPE (with a broader molecular weight distribution) have high levels of blocking, likely due to the presence of low molecular polymer chains (often referred to as waxes) that can migrate from the LLDPE (e.g., in the core layer) to the inner and outer surfaces of the films. Typical methods to address increased blocking include the use of antiblock additives (e.g., diatomaceous earth, talc, and synthetic silica) and slip additives (e.g., fatty amides such as erucamide, stearamide, and behenamide). However, the use of high levels of antiblock and slip additives negatively impact optical properties, negatively impact printability, increase cost, and can "plate out" (or build-up) on extrusion and converting equipment.

Beneficially, the multilayer cast films described herein utilize a narrow molecular weight distribution LLDPE (e.g., a metallocene-catalyzed LLDPE, or mLLDPE), which has less low molecular weight waxes, and has been found to reduce film blocking. This mLLDPE can be used in the core layer, the inner layer, and/or the outer layer, of the multilayer cast film. Also beneficially, the multilayer cast films described herein can have improved optical properties (haze and gloss), improved mechanical properties (dart impact strength, MD Elmendorf tear strength, and PPT strength), and better resistance to blocking at elevated temperatures, as compared to traditional cast film structures that utilize a broad molecular weight distribution LLDPE.

While not wishing to be bound by the following theory, it is believed that other factors also can affect film blocking. For instance, an ethylene polymer resin that is softer, has lower crystallinity, and has a lower density generally has a greater tendency to block. However, simply increasing stiffness, crystallinity, and density—to reduce blocking—can adversely affect optical and mechanical/strength properties.

A. Multilayer Cast Films—Core Layer Contains an Ethylene/α-Olefin Copolymer

Aspects of this invention are directed to multilayer cast films comprising (a) a core layer having a first side and a second side, (b) an inner layer positioned on the first side of the core layer, and (c) an outer layer positioned on the second side of the core layer. In some aspects, the multilayer cast film can have the three layers described generally as an inner layer, a core layer, and an outer layer, while in other aspects, the multilayer cast film can have four or more layers. Thus, the core layer is not limited only to a middle layer in between an inner layer and the outer layer, i.e., other layers can be present. The inner layer and the outer layer are described as being positioned on a first and a second side, respectively, of the core layer. An additional layer, or layers, can be between the core layer and the inner layer, and likewise, between the core layer and the outer layer.

Various combinations of layers can be present in the multilayer cast films consistent with this invention. FIGS. 1-4, respectively, illustrate representative 3-layer, 4-layer, 5-layer, and 7-layer cast film structures. These and other non-limiting layer configurations follow below, in which letters are used to represent the film layers: I/C/O, I/M/C/O, I/C/M/O, I/M/M/C/O, I/M/C/M/O, I/C/M/M/O, I/M/M/C/M/O, I/M/C/M/M/O, I/M/M/M/C/O, I/M/M/C/M/M/O, I/M/M/C/M/M/O, and I/M/C/M/M/O. In these examples, "C" represents a core layer, "I" represents an inner layer, "O" represents an outer layer, and "M" represents a miscellaneous or intermediate layer. Layers which are next to each other are described as being affixed to or adjacent to each other. For instance, in the multilayer structure I/M/C/O, the "O" layer is adjacent to or affixed to the second side of the "C" layer, and the "O" layer is also positioned on the second side of the "C" layer. Likewise, the "I" layer is not adjacent to or affixed to the first side of the "C" layer, but is positioned on the first side of the "C" layer. Hence, by referring to a given layer as positioned on a side of the core layer, the given layer can be adjacent to or affixed to the core layer, or an additional layer or layers (for example, "M") can be between the given layer and the core layer. There is no upper limit on the total number of layers in a multilayer cast film in accordance with this invention, for instance, 7-layer and 9-layer structures, provided that the inner layer, core layer, and outer layer are present within the multilayer cast film structure. Materials which can be used in the inner layer, core layer, outer layer, and miscellaneous layer(s) are described herein, and can be utilized in any combination without limitation to further describe the multilayer cast film structure.

FIG. 1 illustrates a 3-layer cast film with an I/C/O layer configuration. Specifically, in this multilayer cast film, the inner layer is adjacent the first side of the core layer, and the outer layer is adjacent the second side of the core layer. As described above and illustrated in FIGS. 2-4, multilayer cast films contemplated herein can have four or more layers, e.g., the multilayer cast film can have five layers or seven layers. Accordingly, a miscellaneous or intermediate layer (or layers) can be between the inner layer and the core layer and/or between the outer layer and the core layer.

In one aspect, the multilayer cast film can be a 3-layer structure, in which the inner layer is adjacent the first side of the core layer, and the outer layer is adjacent the second side of the core layer. In another aspect, the multilayer cast film is a 5-layer structure (or 7-layer structure, or 9-layer structure), in which a first intermediate layer is (or one or more first intermediate layers are) positioned between the inner layer and the core layer, and a second intermediate layer is (or one or more second intermediate layers are) positioned between the outer layer and the core layer.

Multilayer cast films described herein are not limited to any particular film thickness, however, multilayer cast films useful in many end-use applications generally have an average film thickness in a range from about 0.5 mils to about 10 mils, wherein a mil is equal to 1/1000 of an inch, or 0.025 mm. In certain aspects, the average film thickness can be in a range from about 0.5 to about 5 mils, from about 0.5 to about 2 mils, from about 0.6 to about 2.5 mils, from about 0.6 to about 1.5 mils, from about 0.7 to about 2 mils, from about 0.7 to about 1.5 mils, or from about 0.8 to about 1.5 mils.

The core layer of the multilayer cast film can comprise, on average, from about 30% to about 80%, or from about 30% to about 50%, of the total film thickness in some aspects, while the core layer can comprise, on average, from about 50% to about 90%, from about 65% to about 85%, from about 65% to about 80%, or from about 70% to about 80%, of the total film thickness in other aspects. Likewise, the outer layer and the inner layer of the multilayer cast film, independently, can comprise, on average, from about 6% to about 25% of the total film thickness; alternatively, from about 8% to about 25%; alternatively, from about 8% to about 20%; or alternatively, from about 10% to about 15%. Totals of these layer percentages of the inner layer, core layer, and outer layer do not exceed 100%, but in instances where the total is less than 100%, the remaining thickness can come from one or more miscellaneous layers, as described herein. For example, an illustrative multilayer cast film can have a 70% core layer, a 15% inner layer, and a 15% outer layer. As another example, an illustrative multilayer cast film can have a 60% core layer, a 10% inner layer, a 15% outer layer, and a 15% miscellaneous layer between the inner layer and the core layer.

Beneficially, the multilayer cast film in accordance with the present invention can have a reduced tendency to block, i.e., the multilayer cast film can be a film configured to reduce blocking, or a film configured to have a reduced blocking force. For instance, in one aspect, the cast film can have a blocking force at 125° F. of less than or equal to about 60 g. The blocking forces of this invention apply to the treated (outer) layer of the multilayer cast film, with a treatment level in the 37-42 dyne level (dyne/cm$^2$) range. In another aspect, the multilayer cast film can be characterized by a blocking force at 125° F. of less than or equal to about 50 g, less than or equal to about 47 g, less than or equal to about 45 g, or less than or equal to about 42 g, and often as low as 10-30 g. Additionally or alternatively, the multilayer cast film can have a blocking force at 125° F. that is less than that of a multilayer cast film containing an otherwise identical ethylene/α-olefin copolymer (i.e., same melt index, density, and additives) in the core layer, but having a ratio of Mw/Mn that is greater than or equal to 4. In some aspects, the multilayer cast film can have a blocking force at 125° F. that is less than that of a multilayer cast film containing an otherwise identical ethylene/α-olefin copolymer by at least about 2%, at least about 5%, at least about 10%, and often up to about 25-50% less. These low blocking forces of the multilayer cast film apply regardless of whether the cast film contains additives such as slip and antiblock, or does not contain such additives.

Multilayer cast films described herein can have optical properties, such as low haze, which can provide beneficial aesthetic or visual impact properties in certain end-use applications. In an aspect, the haze of the multilayer cast film can be less than about 10%; alternatively, less than about 8%; alternatively, in a range from about 2% to about 8%; alternatively, in a range from about 3% to about 7%; alternatively, in a range from about 3% to about 6%; or alternatively, in a range from about 4% to about 6%. These low haze values of the multilayer cast film apply regardless of whether the cast film contains additives such as slip and antiblock, or does not contain such additives.

Additionally or alternatively, the dart impact strength of the multilayer cast film can be in a range from about 80 to about 300 g/mil, from about 90 to about 250 g/mil, from about 90 to about 200 g/mil, or from about 100 to about 175 g/mil. Additionally or alternatively, the multilayer cast film can have a MD Elmendorf tear strength in a range from about 130 to about 300 g/mil, from about 150 to about 300 g/mil, or from about 150 to about 250 g/mil.

In many end-use applications, a low coefficient of friction (COF) is important. Generally, the multilayer cast film can have a kinetic COF (film outer layer to film outer layer and/or film inner layer to film inner layer) of less than or equal to about 0.2 in one aspect, less than or equal to about 0.18 in another aspect, and less than or equal to about 0.15 in yet another aspect. Typically, these low COF values can be achieved with additives such as slip and antiblock.

The stiffness of the multilayer cast film, often quantified by the 1% secant modulus, can be configured to allow high speed printing and/or packaging operations. For instance, a stiffness (or secant modulus) that is too low can result in reduced printing and/or packaging speeds. Accordingly, in some aspects of this invention, the multilayer cast film described herein can have a MD (or CD) 1% secant modulus in a range from about 20 to about 40 kpsi, from about 22 to about 35 kpsi, or from about 23 to about 30 kpsi.

A1. Core Layer

In an aspect of this invention, the multilayer cast film can comprise (a) a core layer having a first side and a second side, (b) an inner layer positioned on the first side of the core layer, and (c) an outer layer positioned on the second side of the core layer. In accordance with this aspect of the invention, the core layer can comprise an ethylene/α-olefin copolymer, the ethylene/α-olefin copolymer characterized by a melt index in a range from about 2 to about 12 g/10 min, a density in a range from about 0.91 to about 0.95 g/cm³, and a ratio of Mw/Mn in a range from about 2 to about 3.5. The ethylene/α-olefin copolymer can comprise (or consist essentially of, or consist of) an ethylene/1-butene copolymer, an ethylene/1-hexene copolymer, an ethylene/1-octene copolymer, or any combination thereof.

Ethylene/α-olefin copolymers that can be employed in the core layer of this multilayer cast film often can have a melt index (MI) in a range from about 2 to about 10 g/10 min. Melt indices in the range from about 2 to about 8 g/10 min, from about 3 to about 7 g/10 min, from about 3 to about 6 g/10 min, from about 2 to about 5 g/10 min, or from about 3 to about 5 g/10 min, are contemplated and can be used in aspects of this invention.

In an aspect, the density of the ethylene copolymer typically can fall within the range from about 0.915 to about 0.95 g/cm³, or from about 0.91 to about 0.945 g/cm³. In another aspect, the ethylene copolymer density can be in a range from about 0.91 to about 0.94 g/cm³, or from about 0.91 to about 0.93 g/cm³. Yet, in another aspect, the density can be in a range from about 0.915 to about 0.94 g/cm³, from about 0.915 to about 0.935 g/cm³, from about 0.915 to about 0.93 g/cm³, or from about 0.918 to about 0.928 g/cm³.

An ethylene copolymer within the scope of the present invention generally can have a weight-average molecular weight (Mw) in a range from about 65,000 to about 120,000 g/mol, and in some aspects, from about 70,000 to about 105,000 g/mol, or from about 70,000 to about 100,000 g/mol. Additionally or alternatively, the ethylene copolymer can have a peak molecular weight (Mp) in a range from about 40,000 to about 100,000 g/mol, from about 50,000 to about 90,000 g/mol, or from about 55,000 to about 85,000 g/mol. Additionally or alternatively, the ethylene copolymer can have a number-average molecular weight (Mn) in a range from about 18,000 to about 55,000 g/mol, from about 20,000 to about 50,000 g/mol, or from about 25,000 to about 50,000 g/mol. Additionally or alternatively, the ethylene copolymer can have a z-average molecular weight (Mz) in a range from about 100,000 to about 300,000 g/mol, from about 100,000 to about 200,000 g/mol, or from about 125,000 to about 175,000 g/mol.

The ethylene copolymer in the core layer has a relatively narrow molecular weight distribution, as measured by the ratio of Mw/Mn, which generally falls in the range from about 2 to about 3.5. Specifically contemplated ranges for the ratio of Mw/Mn encompassed by the present invention can include, but are not limited to, from about 2 to about 3.2, from about 2.1 to about 3.5, from about 2 to about 3, from about 2 to about 2.8, from about 2.1 to about 3.3, or from about 2.1 to about 2.8. While not being limited thereto, the ratio of Mz/Mw of the ethylene/α-olefin copolymer often falls within a range from about 1.5 to about 2.5, such as from about 1.5 to about 2.2, or from about 1.6 to about 2.4. Additionally, the ethylene/α-olefin copolymer can be characterized by a unimodal molecular weight distribution.

The ethylene/α-olefin copolymer in the core layer has a relatively low amount of hexane extractables, a relatively low amount of xylene solubles, or both. Such parameters can be important for certain end-use applications, such as food packaging. For instance, the ethylene/α-olefin copolymer can have less than or equal to about 5 wt. %, less than or equal to about 2 wt. %, or less than or equal to about 1 wt. %, of hexane extractables, and often as low as 0.1-0.5 wt. %. Additionally or alternatively, the ethylene/α-olefin copolymer can have less than or equal to about 5 wt. %, less than or equal to about 2 wt. %, or less than or equal to about 1 wt. %, of xylene solubles, and often as low as 0.1-0.5 wt. %.

While not wishing to be bound by the following theory, it is believed that the disclosed multilayer cast films are better suited for end-use applications such as bakery and bread bags when the ethylene/α-olefin copolymer has properties in the specified ranges. For instance, when the density of the ethylene/α-olefin copolymer is too low, the resultant film can be too soft and block more easily, whereas when the density is too high, optical and mechanical/strength properties of the film can deteriorate. Additionally, when the ratio of Mw/Mn or Mz/Mw (or hexane extractables, or xylene solubles) is too high, film blocking can increase. Moreover, when the melt index of the ethylene/α-olefin copolymer is too low, it can be difficult or impossible to process on cast film equipment (viscosity and molecular weights are too high) and interfacial instability with the other layers of the film can result due to different rheology, whereas when the melt index is too high, film blocking can increase and mechanical/strength properties of the film can decrease.

Generally, the core layer contains at least about 40 wt. % of the ethylene/α-olefin copolymer, based on the total weight of the core layer. However, in particular aspects of this invention, the majority of the core layer is the ethylene/α-olefin copolymer. Accordingly, greater than or equal to about 60 wt. %, greater than or equal to about 70 wt. %, greater than or equal to about 90 wt. %, or greater than or equal to about 95 wt. %, of the core layer can be the ethylene/α-olefin copolymer.

The core layer can contain a blend or mixture of the ethylene/α-olefin copolymer and a second ethylene polymer. In such circumstances, the second ethylene polymer can comprise a very low density polyethylene (VLDPE), a linear low density polyethylene (LLDPE), a high density polyethylene (HDPE), or a low density polyethylene (LDPE), and this can include any combination of these materials. The second ethylene polymer is not limited to any particular polymerization process and reactor system and/or any particular catalyst system. For example, the polymerization reactor system used to produce the second ethylene polymer can comprise a slurry reactor, a gas-phase reactor, a solution reactor, or various combinations thereof (e.g., including dual reactor systems). The catalyst system used to produce the second ethylene polymer can be a chromium-based catalyst system, a Ziegler-Natta based catalyst system, a metallocene-based catalyst system, or combinations thereof, and the catalyst system can comprise one or more transition metals, such as chromium, vanadium, titanium, zirconium, hafnium, and the like, or combinations thereof. Hence, all traditional LLDPE polymers are encompassed herein, as well as all metallocene-catalyzed LLDPE (mLLDPE) resins. LDPE copolymers can be made in a high pressure tubular or autoclave reactor. Generally, HDPE resins have a density of greater than about 0.945 g/cm$^3$, and VLDPE resins of below about 0.915 g/cm$^3$, with LLDPE spanning between, although there can be, and often is, overlap.

A2. Inner and Outer Layers

In an aspect of this invention, a multilayer cast film can comprise (a) a core layer having a first side and a second side, the core layer comprising an ethylene/α-olefin copolymer, (b) an inner layer positioned on the first side of the core layer, the inner layer comprising a first low density polyethylene homopolymer, and (c) an outer layer positioned on the second side of the core layer, the outer layer comprising a second low density polyethylene homopolymer. In some aspects, the inner layer and the outer layer can have the same composition—comprise the same polymer or the same blend of polymers (e.g., the first low density polyethylene homopolymer and the second low density polyethylene homopolymer can be the same), or alternatively, the inner layer and the outer layer can have different compositions—comprise different polymers or a different blend of polymers (e.g., the first low density polyethylene homopolymer and the second low density polyethylene homopolymer can be different). In further aspects, the inner layer and/or the outer layer can provide a surface capable of surface printing and/or reverse printing, e.g., a surface providing good printability, a surface with adequate surface energy (e.g., dyne level) retention for various printing ink types/systems, etc.

The first low density polyethylene homopolymer and the second low density polyethylene homopolymer can have any melt index suitable for cast film processing. Generally, the first low density polyethylene homopolymer and the second low density polyethylene homopolymer, independently, can have a melt index in a range from about 1 to about 8 g/10 min, from about 1.5 to about 6 g/10 min, from about 1.8 to about 5 g/10 min, or from about 2 to about 4 g/10 min. Likewise, the first low density polyethylene homopolymer and the second low density polyethylene homopolymer can have suitable density. Often, the density of the first low density polyethylene homopolymer and the second low density polyethylene homopolymer, independently, can be in a range from about 0.91 to about 0.94 g/cm$^3$, from about 0.915 to about 0.935 g/cm$^3$, from about 0.92 to about 0.935 g/cm$^3$, from about 0.922 to about 0.932 g/cm$^3$, or from about 0.925 to about 0.932 g/cm$^3$.

Generally, the majority of the inner layer is the first low density polyethylene homopolymer, and the majority of the outer layer is the second low density polyethylene homopolymer, but this is not a requirement. In an aspect, greater than or equal to about 60 wt. %, greater than or equal to about 80 wt. %, greater than or equal to about 90 wt. %, greater than or equal to about 95 wt. %, or greater than or equal to about 99 wt. %, of the inner layer is the first low density polyethylene homopolymer. Likewise, in another aspect, greater than or equal to about 60 wt. %, greater than or equal to about 80 wt. %, greater than or equal to about 90 wt. %, greater than or equal to about 95 wt. %, or greater than or equal to about 99 wt. %, of the outer layer is the second low density polyethylene homopolymer.

Consistent with certain aspects of this invention, the inner layer and/or the outer layer can contain a blend of LDPE with a medium density LLDPE, and in some cases, a metallocene-catalyzed LLDPE (mLLDPE). For example, the inner layer of the cast film can comprise a blend of the first low density polyethylene homopolymer and a first medium density ethylene/α-olefin copolymer, wherein the first medium density ethylene/α-olefin copolymer can be characterized by the following polymer attributes: a melt index in a range from about 2 to about 12 g/10 min, a density in a range from about 0.925 to about 0.94 g/cm$^3$, and a ratio of Mw/Mn in a range from about 2 to about 3.5. The blend ratio of the first low density polyethylene homopolymer and the first medium density ethylene/α-olefin copolymer is not particularly limited, however, in some aspects, the weight ratio of the first low density polyethylene homopolymer to the first medium density ethylene/α-olefin copolymer can be in a range from about 10:90 to about 90:10, from about 15:85 to about 85:15, or from about 25:75 to about 75:25, while in other aspects, the weight ratio can be in a range from about 30:70 to about 70:30, from about 35:65 to about 65:35, or from about 40:60 to about 60:40.

Similarly, the outer layer of the cast film can comprise a blend of the second low density polyethylene homopolymer and a second medium density ethylene/α-olefin copolymer, wherein the second medium density ethylene/α-olefin copolymer can be characterized by the following polymer attributes: a melt index in a range from about 2 to about 12 g/10 min, a density in a range from about 0.925 to about 0.94 g/cm$^3$, and a ratio of Mw/Mn in a range from about 2 to about 3.5. The blend ratio of the second low density polyethylene homopolymer and the second medium density ethylene/α-olefin copolymer is not particularly limited, however, in some aspects, the weight ratio of the second low density polyethylene homopolymer to the second medium density ethylene/α-olefin copolymer can be in a range from about 10:90 to about 90:10, from about 15:85 to about 85:15, or from about 25:75 to about 75:25, while in other aspects, the weight ratio can be in a range from about 30:70 to about 70:30, from about 35:65 to about 65:35, or from about 40:60 to about 60:40.

In further aspects, the first medium density ethylene/α-olefin copolymer and the second medium density ethylene/α-olefin copolymer, independently, can be characterized by a melt index in a range from about 2 to about 8 g/10 min, from about 2 to about 6 g/10 min, from about 2 to about 5 g/10 min, from about 2.5 to about 5 g/10 min, or from about 3 to about 7 g/10 min. Additionally or alternatively, the first medium density ethylene/α-olefin copolymer and the second medium density ethylene/α-olefin copolymer, independently, can be characterized by a density in a range from about 0.928 to about 0.938 g/cm$^3$, from about 0.93 to about 0.94 g/cm$^3$, or from about 0.93 to about 0.936 g/cm$^3$. Additionally or alternatively, the first medium density ethylene/α-olefin copolymer and the second medium density ethylene/α-olefin copolymer, independently, can be characterized by a ratio of Mw/Mn in a range from about 2 to about 3.2, from about 2.1 to about 3.5, from about 2 to about 3, from about 2 to about 2.8, from about 2.1 to about 3.3, or from about 2.2 to about 3.2.

Consistent with aspects of this invention in which both the inner layer and the outer layer contain such blends, the inner layer and the outer layer can have the same composition—comprise the same blend of polymers (e.g., the first medium density ethylene/α-olefin copolymer and the second medium density ethylene/α-olefin copolymer can be the same), or alternatively, the inner layer and the outer layer can have different compositions—comprise a different blend of polymers (e.g., the first medium density ethylene/α-olefin copolymer and the second medium density ethylene/α-olefin copolymer can be different).

The inner layer and/or the outer layer can contain a blend of the LDPE homopolymer with a second ethylene polymer, and in this aspect of the invention, the second ethylene polymer is not a medium density ethylene/α-olefin copolymer as described herein—characterized by a melt index in a range from about 2 to about 12 g/10 min, a density in a range from about 0.925 to about 0.94 g/cm$^3$, and a ratio of Mw/Mn in a range from about 2 to about 3.5. Therefore, the inner layer and/or the outer layer can further comprise a second ethylene polymer, and as described herein, the second ethylene polymer can comprise a very low density polyethylene (VLDPE), a linear low density polyethylene (LLDPE), a high density polyethylene (HDPE), or a low density polyethylene (LDPE), and this can include any combination of these materials. Also as described herein, the second ethylene polymer is not limited to being produced by any particular polymerization process and reactor system and/or any particular catalyst system.

A3. Processes for Producing Multilayer Cast Films

Processes for producing multilayer cast films having a reduced blocking force also are disclosed herein. One such process can comprise (i) introducing a coextruded flow into a cast film coextrusion die, the coextruded flow comprising (a) a core layer flow having a first side and a second side, the core layer flow comprising an ethylene/α-olefin copolymer; (b) an inner layer flow positioned on the first side of the core layer flow, the inner layer flow comprising a first low density polyethylene homopolymer; and (c) an outer layer flow positioned on the second side of the core layer flow, the outer layer flow comprising a second low density polyethylene homopolymer; and (ii) drawing down the coextruded flow exiting the cast film coextrusion die to produce the multilayer cast film. The ethylene/α-olefin copolymer can be characterized by a melt index in a range from about 2 to about 12 g/10 min, a density in a range from about 0.91 to about 0.95 g/cm$^3$, and a ratio of Mw/Mn in a range from about 2 to about 3.5, and in some aspects, the cast film can have a blocking force at 125° F. of less than or equal to about 60 g.

Generally, the features of any of the processes disclosed herein (e.g., the core layer flow, the ethylene/α-olefin copolymer, the inner layer flow, the first low density polyethylene homopolymer, the outer layer flow, the second low density polyethylene homopolymer, and the blocking force, among others) are independently described herein, and these features can be combined in any combination to further describe the disclosed processes. Further, any of the features of the multilayer cast film, core layer, inner and outer layers, miscellaneous or intermediate layers, and additives disclosed herein also can be applied to this process for producing the multilayer cast film. Moreover, other process steps may be conducted before, during, and/or after any of the steps listed in the disclosed processes, unless stated otherwise. Additionally, multilayer cast film produced in accordance with any of the disclosed methods/processes are within the scope of this disclosure and are encompassed herein.

The multilayer, or coextruded, cast film can be produced using any traditional cast film equipment (extruders, die, etc.), which are well known to those of skill in the art. Such is described, for example, in the *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety.

B. Multilayer Cast Films—Inner/Outer Layers Contain an Ethylene/α-Olefin Copolymer Aspects of this invention are directed to multilayer cast films comprising (A) a core layer having a first side and a second side, the core layer comprising an ethylene polymer, (B) an inner layer positioned on the first side of the core layer, the inner layer comprising a first ethylene/α-olefin copolymer, and (C) an outer layer positioned on the second side of the core layer, the outer layer comprising a second ethylene/α-olefin copolymer. In some aspects, the multilayer cast film can have the three layers described generally as an inner layer, a core layer, and an outer layer, while in other aspects, the multilayer cast film can have four or more layers. Thus, the core layer is not limited only to a middle layer in between an inner layer and the outer layer, i.e., other layers can be present. The inner layer and the outer layer are described as being positioned on a first and a second side, respectively, of the core layer. An additional layer, or layers, can be between the core layer and the inner layer, and likewise, between the core layer and the outer layer.

As described above and shown in FIGS. 1-4, various combinations of layers can be present in the multilayer cast films consistent with this invention. Representative and non-limiting layer configurations follow below, in which letters are used to represent the film layers: I/C/O, I/M/C/O, I/C/M/O, I/M/M/C/O, I/M/C/M/O, I/C/M/M/O, I/M/M/C/M/O, I/M/C/M/M/O, I/M/M/C/M/O, I/M/M/C/M/M/O, I/M/M/C/M/O, and I/M/C/M/M/M/O. In these examples, "C" represents a core layer, "I" represents an inner layer, "O" represents an outer layer, and "M" represents a miscellaneous or intermediate layer. Layers which are next to each other are described as being affixed to or adjacent to each other. For instance, in the multilayer structure I/M/C/O, the "O" layer is adjacent to or affixed to the second side of the "C" layer, and the "O" layer is also positioned on the second side of the "C" layer. Likewise, the "I" layer is not adjacent to or affixed to the first side of the "C" layer, but is positioned on the first side of the "C" layer. Hence, by referring to a given layer as positioned on a side of the core layer, the given layer can be adjacent to or affixed to the core layer, or an additional layer or layers (for example, "M") can be between the given layer and the core layer. There is no upper limit on the total number of layers in a multilayer cast film in accordance with this invention, for instance, 7-layer and 9-layer structures, provided that the inner layer, core layer, and outer layer are present within the multilayer cast film structure. Materials which can be used in the inner layer, core layer, outer layer, and miscellaneous layer(s) are described herein, and can be utilized in any combination without limitation to further describe the multilayer cast film structure.

In one aspect, the multilayer cast film can be a 3-layer structure, in which the inner layer is adjacent the first side of the core layer, and the outer layer is adjacent the second side of the core layer. In another aspect, the multilayer cast film is a 5-layer structure (or 7-layer structure, or 9-layer structure), in which a first intermediate layer is (or one or more first intermediate layers are) positioned between the inner layer and the core layer, and a second intermediate layer is (or one or more second intermediate layers are) positioned between the outer layer and the core layer.

While not limited thereto, these multilayer cast films generally have an average film thickness in a range from about 0.5 mils to about 10 mils, from about 0.5 to about 5 mils, from about 0.5 to about 2 mils, from about 0.6 to about 2.5 mils, from about 0.6 to about 1.5 mils, from about 0.7 to about 2 mils, from about 0.7 to about 1.5 mils, or from about 0.8 to 1.5 mils.

The core layer of the multilayer cast film can comprise, on average, from about 30% to about 80%, or from about 30% to about 50%, of the total film thickness in some aspects, while the core layer can comprise, on average, from about 50% to about 90%, from about 65% to about 85%, from about 65% to about 80%, or from about 70% to about 80%, of the total film thickness in other aspects. Likewise, the outer layer and the inner layer of the multilayer cast film, independently, can comprise, on average, from about 6% to about 25% of the total film thickness; alternatively, from about 8% to about 25%; alternatively, from about 8% to about 20%; or alternatively, from about 10% to about 15%. Totals of these layer percentages of the inner layer, core layer, and outer layer do not exceed 100%, but in instances where the total is less than 100%, the remaining thickness can come from one or more miscellaneous layers, as described herein. For example, an illustrative multilayer cast film can have a 70% core layer, a 15% inner layer, and a 15% outer layer. As another example, an illustrative multilayer cast film can have a 60% core layer, a 10% inner layer, a 15% outer layer, and a 15% miscellaneous layer between the inner layer and the core layer.

Beneficially, the multilayer cast film can have a reduced tendency to block, i.e., the multilayer cast film can be a film configured to reduce blocking, or a film configured to have a reduced blocking force. For instance, in one aspect, the cast film can have a blocking force at 125° F. of less than or equal to about 60 g. The blocking forces of this invention apply to the treated (outer) layer of the multilayer cast film, with a treatment level in the 37-42 dyne level (dyne/cm$^2$) range. In another aspect, the multilayer cast film can be characterized by a blocking force at 125° F. of less than or equal to about 50 g, less than or equal to about 47 g, less than or equal to about 45 g, or less than or equal to about 42 g, and often as low as 10-30 g. Additionally or alternatively, the multilayer cast film can have a blocking force at 125° F. that is less than that of a multilayer cast film containing an otherwise identical ethylene/α-olefin copolymer (i.e., same melt index, density, and additives) in the inner layer and outer layer, but having a ratio of Mw/Mn that is greater than or equal to 4. In some aspects, the multilayer cast film can have a blocking force at 125° F. that is less than that of a multilayer cast film containing an otherwise identical ethylene/α-olefin copolymer by at least about 2%, at least about 5%, at least about 10%, and often up to about 25-50% less. These low blocking forces of the multilayer cast film apply regardless of whether the cast film contains additives such as slip and antiblock, or does not contain such additives.

These multilayer cast films described herein can have optical properties, such as low haze, which can provide beneficial aesthetic or visual impact properties in certain end-use applications. In an aspect, the haze of the multilayer cast film can be less than about 10%; alternatively, less than about 8%; alternatively, in a range from about 2% to about 8%; alternatively, in a range from about 3% to about 7%; alternatively, in a range from about 3% to about 6%; or alternatively, in a range from about 4% to about 6%. These low haze values of the multilayer cast film apply regardless of whether the cast film contains additives such as slip and antiblock, or does not contain such additives.

Additionally or alternatively, the dart impact strength of the multilayer cast film can be in a range from about 80 to about 300 g/mil, from about 90 to about 250 g/mil, from about 90 to about 200 g/mil, or from about 100 to about 175 g/mil. Additionally or alternatively, the multilayer cast film can have a MD Elmendorf tear strength in a range from about 130 to about 300 g/mil, from about 150 to about 300 g/mil, or from about 150 to about 250 g/mil.

In many end-use applications, a low coefficient of friction (COF) is important. Generally, the multilayer cast film can have a kinetic COF (film outer layer to film outer layer and/or film inner layer to film inner layer) of less than or equal to about 0.2 in one aspect, less than or equal to about 0.18 in another aspect, and less than or equal to about 0.15 in yet another aspect. Typically, these low COF values can be achieved with additives such as slip and antiblock.

The stiffness of the multilayer cast film, often quantified by the 1% secant modulus, can be configured to allow high speed printing and/or packaging operations. For instance, a stiffness (or secant modulus) that is too low can result in reduced printing and/or packaging speeds. Accordingly, in some aspects of this invention, the multilayer cast film described herein can have a MD (or CD) 1% secant modulus in a range from about 20 to about 40 kpsi, from about 22 to about 35 kpsi, or from about 23 to about 30 kpsi.

B1. Core Layer

In an aspect of this invention, the multilayer cast film can comprise (A) a core layer having a first side and a second side, the core layer comprising an ethylene polymer, (B) an inner layer positioned on the first side of the core layer, the inner layer comprising a first ethylene/α-olefin copolymer, and (C) an outer layer positioned on the second side of the core layer, the outer layer comprising a second ethylene/α-olefin copolymer. The core layer, in accordance with this aspect of the invention, can comprise (or consist essentially of, or consist of) any suitable ethylene polymer, for instance, a very low density polyethylene (VLDPE), a linear low density polyethylene (LLDPE), a high density polyethylene (HDPE), or a low density polyethylene (LDPE); or alternatively, the ethylene polymer can comprise a HDPE, a LLDPE, or a LDPE. The ethylene polymer can have any melt index, density, and ratio of Mw/Mn suitable for a multilayer cast film and the processing and formation thereof, as would be recognized by those of skill in the art.

However, the core layer can contain more than one polymer, e.g., a blend or mixture of the ethylene polymer with a second ethylene polymer. Accordingly, the core layer can contain a blend of a VLDPE and a HDPE, a blend of a LDPE and a HDPE, a blend of a LLDPE and a HDPE, a blend of a VLDPE and a LDPE, a blend of a LLDPE and a LDPE, a blend of a VLDPE and a LLDPE, a blend of a LDPE and a different LDPE, or a blend of a LLDPE and a different LLDPE, and so forth. As an illustrative example, the core layer can contain a blend of a LDPE and a LLDPE (a blend of a LDPE homopolymer and a LLDPE copolymer). While not limited thereto, the weight ratio of LDPE:LLDPE in the core layer can range from about 10:90 to about 90:10, or from about 15:85 to about 85:15, and in some instances, from about 25:75 to about 75:25, or from about 40:60 to about 60:40.

In these and other aspects, the LLDPE copolymer can be a traditional (broad molecular weight distribution) LLDPE, or alternatively, a metallocene-catalyzed (narrow molecular weight distribution) LLDPE, also referred to as a mLLDPE.

B2. Inner and Outer Layers

In an aspect of this invention, the multilayer cast film can comprise (A) a core layer having a first side and a second side, the core layer comprising an ethylene polymer, (B) an inner layer positioned on the first side of the core layer, the inner layer comprising a first ethylene/α-olefin copolymer, and (C) an outer layer positioned on the second side of the core layer, the outer layer comprising a second ethylene/α-olefin copolymer. In this aspect of the invention, the first ethylene/α-olefin copolymer and the second ethylene/α-olefin copolymer can be the same or different, and can be characterized, independently, by a melt index in a range from about 0.5 to about 12 g/10 min, a density in a range from about 0.925 to about 0.94 g/cm$^3$, and a ratio of Mw/Mn in a range from about 2 to about 3.5. Independently, the first ethylene/α-olefin copolymer and the second ethylene/α-olefin copolymer can comprise (or consist essentially of, or consist of) an ethylene/1-butene copolymer, an ethylene/1-hexene copolymer, an ethylene/1-octene copolymer, or any combination thereof.

In some aspects, the inner layer and the outer layer can have the same composition—comprise the same polymer or the same blend of polymers (e.g., the first ethylene/α-olefin copolymer and the second ethylene/α-olefin copolymer can be the same), or alternatively, the inner layer and the outer layer can have different compositions—comprise different polymers or a different blend of polymers (e.g., the first ethylene/α-olefin copolymer and the second ethylene/α-olefin copolymer can be different). In further aspects, the inner layer and/or the outer layer can provide a surface capable of surface printing and/or reverse printing, e.g., a surface providing good printability, a surface with adequate surface energy (e.g., dyne level) retention for various printing ink types/systems, etc.

Ethylene/α-olefin copolymers that can be employed in the inner layer and the outer layer of these multilayer cast films often can have a melt index (MI) in a range from about 0.5 to about 12 g/10 min. Typically, the first ethylene/α-olefin copolymer and the second ethylene/α-olefin copolymer, independently, can have a MI in a range from about 2 to about 8 g/10 min, from about 3 to about 7 g/10 min, from about 3 to about 6 g/10 min, from about 2 to about 5 g/10 min, or from about 3 to about 5 g/10 min.

In an aspect, the density of the first ethylene/α-olefin copolymer and the second ethylene/α-olefin copolymer, independently, can fall within a range from about 0.925 to about 0.94 g/cm$^3$. In another aspect, the density of the first ethylene/α-olefin copolymer and the second ethylene/α-olefin copolymer, independently, can range from about 0.928 to about 0.94 g/cm$^3$; alternatively, from about 0.925 to about 0.938 g/cm$^3$; alternatively, from about 0.928 to about 0.938 g/cm$^3$; alternatively, from about 0.93 to about 0.94 g/cm$^3$; or alternatively, from about 0.93 to about 0.938 g/cm$^3$.

First ethylene/α-olefin and second ethylene/α-olefin copolymers within the scope of the present invention independently can have, for example, a weight-average molecular weight (Mw) in a range from about 65,000 to about 120,000 g/mol, and in some aspects, from about 70,000 to about 105,000 g/mol, or from about 70,000 to about 100,000 g/mol. Additionally or alternatively, the first ethylene/α-olefin copolymer and the second ethylene/α-olefin copolymer, independently, can have a peak molecular weight (Mp) in a range from about 40,000 to about 100,000 g/mol, from about 50,000 to about 90,000 g/mol, or from about 55,000 to about 85,000 g/mol. Additionally or alternatively, the first ethylene/α-olefin copolymer and the second ethylene/α-olefin copolymer, independently, can have a number-average molecular weight (Mn) in a range from about 18,000 to about 55,000 g/mol, from about 20,000 to about 50,000 g/mol, or from about 25,000 to about 50,000 g/mol. Additionally or alternatively, the first ethylene/α-olefin copolymer and the second ethylene/α-olefin copolymer, independently, can have a z-average molecular weight (Mz) in a range from about 100,000 to about 300,000 g/mol, from about 100,000 to about 200,000 g/mol, or from about 125,000 to about 175,000 g/mol.

The first ethylene/α-olefin copolymer and the second ethylene/α-olefin copolymer in the inner layer and the outer layer, respectively, have a relatively narrow molecular weight distribution, as measured by the ratio of Mw/Mn, which generally falls in the range from about 2 to about 3.5. Specifically contemplated ranges for the ratio of Mw/Mn of the first ethylene/α-olefin copolymer and the second ethylene/α-olefin copolymer, independently, include but are not limited to, from about 2 to about 3.2, from about 2.1 to about 3.5, from about 2 to about 3, from about 2 to about 2.8, from about 2.1 to about 3.3, or from about 2.1 to about 2.8. While not being limited thereto, the ratio of Mz/Mw of the first ethylene/α-olefin copolymer and the second ethylene/α-olefin copolymer, independently, can fall within a range from about 1.5 to about 2.5, such as from about 1.5 to about 2.2, or from about 1.6 to about 2.4. Additionally, the first ethylene/α-olefin copolymer, the second ethylene/α-olefin copolymer, or both, can be characterized by a unimodal molecular weight distribution.

The first ethylene/α-olefin copolymer and the second ethylene/α-olefin copolymer in inner layer and the outer layer, respectively, have relatively low amounts of hexane extractables, relatively low amounts of xylene solubles, or both. Such parameters can be important for certain end-use applications, such as food packaging. For instance, the first ethylene/α-olefin copolymer and the second ethylene/α-olefin copolymer, independently, can have less than or equal to about 5 wt. %, less than or equal to about 2 wt. %, less than or equal to about 1.5 wt. %, or less than or equal to about 1 wt. %, of hexane extractables, and often as low as 0.1-0.5 wt. %. Additionally or alternatively, the first ethylene/α-olefin copolymer and the second ethylene/α-olefin copolymer, independently, can have less than or equal to about 5 wt. %, less than or equal to about 2 wt. %, or less than or equal to about 1 wt. %, of xylene solubles, and often as low as 0.1-0.5 wt. %.

Generally, the inner layer contains at least about 10 wt. % of the first ethylene/α-olefin copolymer, based on the total weight of the inner layer. More often, the inner layer contains greater than or equal to about 20 wt. %, or greater than or equal to about 40 wt. %, of the first ethylene/α-olefin copolymer. However, in particular aspects of this invention, the majority of the inner layer is the first ethylene/α-olefin copolymer. Accordingly, greater than or equal to about 60 wt. %, greater than or equal to about 75 wt. %, greater than or equal to about 90 wt. %, or greater than or equal to about 95 wt. %, of the inner layer can be the first ethylene/α-olefin copolymer.

Likewise, the outer layer contains at least about 10 wt. % of the second ethylene/α-olefin copolymer, based on the total weight of the outer layer. More often, the outer layer contains greater than or equal to about 20 wt. %, or greater than or equal to about 40 wt. %, of the second ethylene/α-olefin copolymer. However, in particular aspects of this invention, the majority of the outer layer is the second ethylene/α-olefin copolymer. Accordingly, greater than or equal to about 60 wt. %, greater than or equal to about 75 wt. %, greater than or equal to about 90 wt. %, or greater than or equal to about 95 wt. %, of the inner layer can be the second ethylene/α-olefin copolymer.

Consistent with certain aspects of this invention, the inner layer and/or the outer layer can contain a blend of a LDPE homopolymer with the ethylene/α-olefin copolymer. For example, the inner layer of the cast film can comprise a blend of the first ethylene/α-olefin copolymer and a first low density polyethylene homopolymer. The blend ratio of the first ethylene/α-olefin copolymer and the first low density polyethylene homopolymer is not particularly limited, however, in some aspects, the weight ratio of the first ethylene/α-olefin copolymer to the first low density polyethylene homopolymer in the inner layer can be in a range from about 10:90 to about 90:10, from about 15:85 to about 85:15, or from about 25:75 to about 75:25, while in other aspects, the weight ratio can be in a range from about 30:70 to about 70:30, from about 35:65 to about 65:35, or from about 40:60 to about 60:40.

Similarly, the outer layer of the cast film can comprise a blend of the second ethylene/α-olefin copolymer and a second low density polyethylene homopolymer. Likewise, the blend ratio of the second ethylene/α-olefin copolymer and the second low density polyethylene homopolymer is not particularly limited, however, in some aspects, the weight ratio of the second ethylene/α-olefin copolymer to the second low density polyethylene homopolymer in the outer layer can be in a range from about 10:90 to about 90:10, from about 15:85 to about 85:15, or from about 25:75 to about 75:25, while in other aspects, the weight ratio can be in a range from about 30:70 to about 70:30, from about 35:65 to about 65:35, or from about 40:60 to about 60:40.

In further aspects, the first low density polyethylene homopolymer and the second low density polyethylene homopolymer, independently, can be characterized by a melt index in a range from about 1 to about 8 g/10 min, from about 1 to about 6 g/10 min, from about 1.5 to about 6 g/10 min, from about 1.8 to about 5 g/10 min, or from about 2 to about 7 g/10 min. Additionally or alternatively, the first low density polyethylene homopolymer and the second low density polyethylene homopolymer, independently, can be characterized by a density in a range from about 0.91 to about 0.94 g/cm$^3$, from about 0.915 to about 0.935 g/cm$^3$, from about 0.92 to about 0.935 g/cm$^3$, from about 0.918 to about 0.928 g/cm$^3$, or from about 0.922 to about 0.932 g/cm$^3$.

Consistent with aspects of this invention in which both the inner layer and the outer layer contain such blends, the inner layer and the outer layer can have the same composition—comprise the same blend of polymers (e.g., the first low density polyethylene homopolymer and the second low density polyethylene homopolymer can be the same), or alternatively, the inner layer and the outer layer can have different compositions—comprise a different blend of polymers (e.g., the first low density polyethylene homopolymer and the second low density polyethylene homopolymer can be different).

B3. Processes for Producing Multilayer Cast Films

Processes for producing multilayer cast films having a reduced blocking force also are disclosed herein. One such process can comprise (i) introducing a coextruded flow into a cast film coextrusion die, the coextruded flow comprising (a) a core layer flow having a first side and a second side, the core layer flow comprising an ethylene polymer; (b) an inner layer flow positioned on the first side of the core layer flow, the inner layer flow comprising a first ethylene/α-olefin copolymer; and (c) an outer layer flow positioned on the second side of the core layer flow, the outer layer flow comprising a second ethylene/α-olefin copolymer; and (ii) drawing down the coextruded flow exiting the cast film coextrusion die to produce the multilayer cast film. The first ethylene/α-olefin copolymer and the second ethylene/α-olefin copolymer are the same or different, and can be characterized by a melt index in a range from about 0.5 to about 12 g/10 min, a density in a range from about 0.925 to about 0.94 g/cm$^3$, and a ratio of Mw/Mn in a range from about 2 to about 3.5, and in some aspects, the cast film can have a blocking force at 125° F. of less than or equal to about 60 g.

Generally, the features of any of the processes disclosed herein (e.g., the core layer flow, the ethylene polymer, the inner layer flow, the first ethylene/α-olefin copolymer, the outer layer flow, the second ethylene/α-olefin copolymer, and the blocking force, among others) are independently described herein, and these features can be combined in any combination to further describe the disclosed processes. Further, any of the features of the multilayer cast film, core layer, inner and outer layers, miscellaneous or intermediate layers, and additives disclosed herein also can be applied to this process for producing the multilayer cast film. Moreover, other process steps may be conducted before, during, and/or after any of the steps listed in the disclosed processes, unless stated otherwise. Additionally, multilayer cast film produced in accordance with any of the disclosed methods/processes are within the scope of this disclosure and are encompassed herein.

The multilayer, or coextruded, cast film can be produced using any traditional cast film equipment (extruders, die, etc.), which are well known to those of skill in the art. Such is described, for example, in the *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety.

Miscellaneous or Intermediate Layers

In some aspects of this invention, the multilayer cast film can comprise a miscellaneous or intermediate layer. Any miscellaneous or intermediate layer (one, or more than one) that may be present in the multilayer cast film can comprise any of the polymers discussed above as being polymer options for the core layer, inner layer, and/or outer layer: for example, a VLDPE, a LLDPE, a HDPE, a LDPE, or any blend or combination thereof. Additional polymers that can be employed either singly or in combination in the miscellaneous or intermediate layer can include, but are not limited to, a polypropylene homopolymer, a polypropylene random copolymer, an impact polypropylene, an ethylene vinyl acetate copolymer (EVA), or an ethylene acrylic acid copolymer (EAA), and the like, or combinations thereof.

In an aspect, the miscellaneous or intermediate layer can be a barrier layer, typically containing a polymer such as nylon or EVOH (ethylene vinyl alcohol), although not limited thereto. Moreover, in another aspect, the miscellaneous or intermediate layer can be a tie layer, while in another aspect, the miscellaneous or intermediate layer can be a layer comprising regrind. A tie layer can be used to promote adhesion between any two layers, such as between a core layer and a barrier layer.

In other aspects, however, the multilayer cast film structure does not contain a tie layer between the inner layer and the core layer or between the outer layer and the core layer. In this aspect, the interlayer bond strengths between the inner layer and the core layer and between the outer layer and the core layer are acceptable for the end-use application, and the addition of a tie layer merely adds cost and complexity.

Additives

Additives are often used in polymer films and formulations to improve the processing or ease of manufacturing of the polymer(s) and its intended finished article. Another use of additives is to impart a certain property or characteristic to the finished article. In aspects of the present invention, one or more additives can be employed in the inner layer, and/or the outer layer, and/or the core layer, and/or any of the miscellaneous or intermediate layers that may be present. Suitable additives which can be employed in the cast film structures or formulations disclosed herein can include, but are not limited to, antioxidants, acid scavengers, antiblock additives, slip additives, colorants, fillers, polymer processing aids, UV inhibitors, and the like, including combinations thereof. Therefore, in certain aspects, the multilayer cast film can comprise an additive selected from an antioxidant, an acid scavenger, an antiblock additive, a slip additive, a colorant, a filler, a polymer processing aid, a UV inhibitor, and the like, or any combination thereof.

Articles of Manufacture

Multilayer cast films described herein can be used to produce various articles of manufacture. For instance, food packaging films can be formed from and/or can comprise a multilayer cast film in accordance with this invention. As an example, the multilayer cast film can be printed on the inner layer and/or on the outer layer using various known processes (e.g., flexographic, rotogravure, etc.) to form a printed bakery or bread bag. As another example, the multilayer cast film can be laminated (e.g., with an adhesive) to another film of the same or different type (e.g., oriented PET or PP) to form a laminated food packaging structure that can be used in a variety of end-use packaging applications. Other suitable articles of manufacture and end-use applications are readily apparent to those of skill in the art in view of this disclosure, and are encompassed herein.

Examples

The invention is further illustrated by the following examples, which are not to be construed in any way as imposing limitations to the scope of this invention. Various other aspects modifications, and equivalents thereof, after reading the description herein, may suggest themselves to one of ordinary skill in the art without departing from the spirit of the present invention or the scope of the appended claims.

Three-layer cast films were produced using standard coextrusion cast film equipment. The extruder ("B" extruder) for the core layer had a 2.5-inch diameter and a 24:1 length-to-diameter (L/D) ratio, and the extruder for the inner layer and outer layer ("A" extruder) had a 2.5-inch diameter and a 24:1 L/D ratio. The inner and outer layers were produced by splitting the feed from the "A" extruder by utilizing a 5-layer Cloeren coextrusion feedblock with an ABBBA configuration. Melt temperatures were approximately 525° C. The cast film die width was 30 inches, and the die gap was 25 mils.

Cast films were produced at a nominal thickness of 1.15 mils. The core layer was 75% of the total thickness, and the inner layer and the outer layer were the same polymer composition, and each constituted 12.5% of the total thickness. The outer layer was corona treated to a treatment level of 37-38 dynes/cm$^2$. The low density polyethylene homopolymer ("LDPE") used in both the inner layer and the outer layer had a nominal melt index of 2.2 g/10 min and a nominal density of 0.930. The main component in the core layer was either an ethylene/1-hexene LLDPE ("LLDPE 1") with a nominal melt index of 3.5 g/10 min and a nominal density of 0.923, or a metallocene-catalyzed ethylene/1-hexene LLDPE ("mLLDPE 2") with a nominal melt index of 4.5 g/10 min and a nominal density of 0.918.

FIG. 5 illustrates the different molecular weight distributions of LLDPE 1 and mLLDPE 2, and Table I summarizes certain polymer properties of LLDPE 1 and mLLDPE 2. In sum, mLLDPE 2 had a narrower molecular weight distribution, both in terms of Mw/Mn and Mz/Mw, than LLDPE 1, as well as significantly lower hexane extractables and xylene solubles.

Table II summarizes the compositions of each of the layers of the multilayer cast films of Examples 1-3. Examples 1-2 had the general structure LDPE/LLDPE/LDPE, with the difference being the relative amount of LDPE and LLDPE 1 in the core layer. Regarding Example 3, a suitable narrow molecular weight distribution, metallocene-catalyzed copolymer having the desired melt index, density, and additive package (e.g., slip additives) to directly substitute for LLDPE 1 in the core layer was not available. Therefore, a lower density copolymer (mLLDPE 2) was used in the core layer, since it had a suitable melt index and narrow molecular weight distribution. To achieve similar density/stiffness and additive levels (e.g., for comparable COF), a small amount of a HDPE and a slip additive masterbatch (in a low density polyethylene carrier resin) were used in Example 3.

Figure 6:
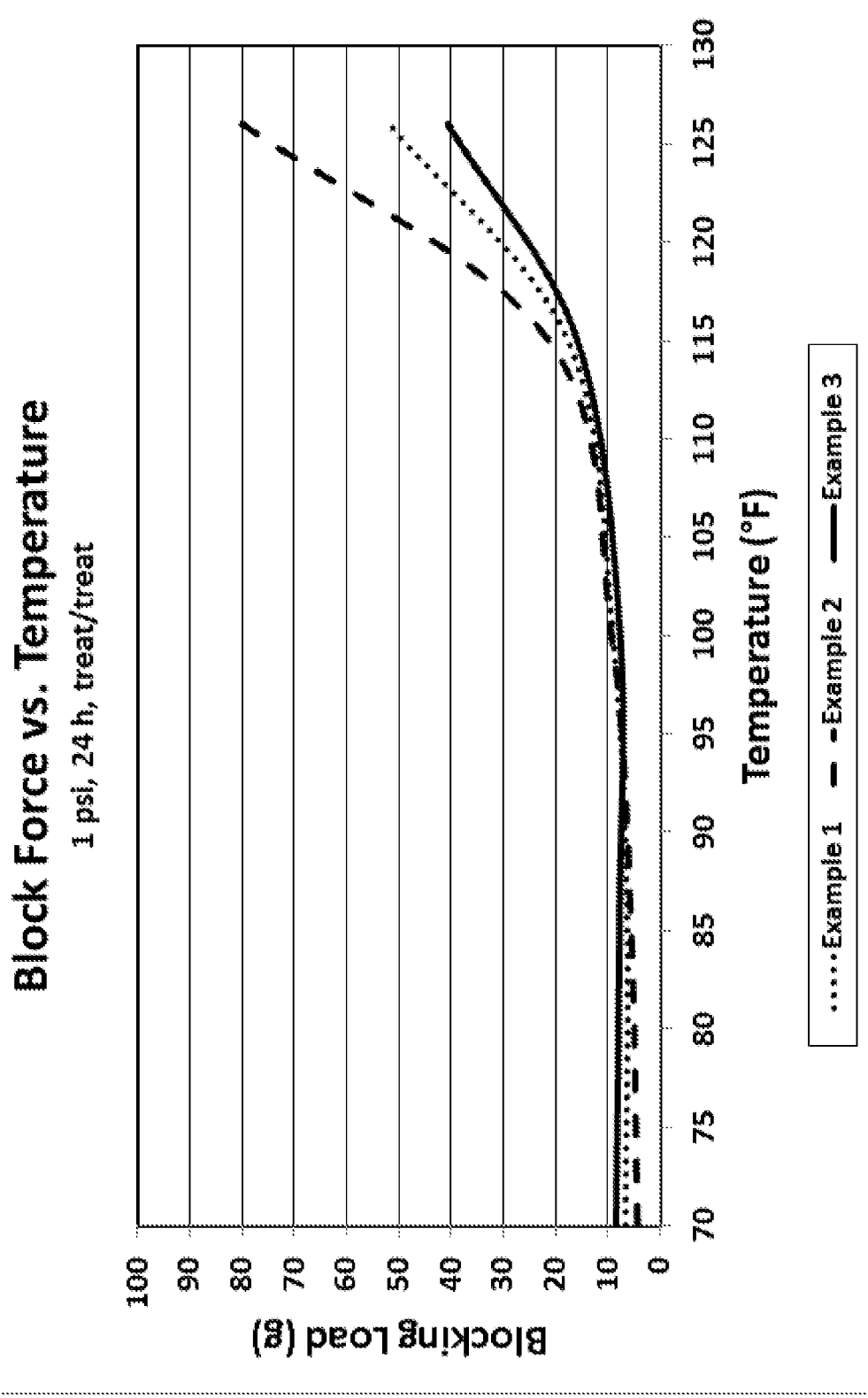
FIG. 6 presents a plot of the blocking force versus temperature for the 3-layer cast films of Examples 1-3.

Table III compares the properties of the multilayer cast films of Examples 1-3. Unexpectedly, at generally equivalent COF, treatment level, heat sealing, and tensile/modulus properties, the multilayer cast film of Example 3 had superior haze, gloss, dart impact strength, MD Elmendorf tear strength, and PPT strength to that of the cast films of Examples 1-2. Also unexpectedly, and beneficially, the multilayer cast film of Example 3 had superior resistance to blocking (lower blocking forces) at elevated temperatures (e.g., 100-125° F.) than the cast films of Examples 1-2. This surprising result is illustrated graphically in FIG. 6, which compares the blocking force versus temperature for the 3-layer cast films of Examples 1-3.

TABLE I

Comparison of LLDPE 1 and mLLDPE 2

| Polymer Resin | Mn/1000 (g/mol) | Mw/1000 (g/mol) | Mz/1000 (g/mol) | Mp/1000 (g/mol) | Mw/Mn | Hexane Extractables (wt. %) | Xylene Solubles (wt. %) |
|---|---|---|---|---|---|---|---|
| LLDPE 1 | 21.9 | 99.0 | 294.8 | 61.1 | 4.5 | 2.2 | 17.5 |
| mLLDPE 2 | 38.6 | 85.9 | 151.7 | 73.3 | 2.2 | 0.7 | 0.8 |

TABLE II

Cast Film Formulations of Examples 1-3

| Polymer Resin | Melt Index (g/10 min) | Density (g/cc) | Slip Additive (ppm) | Antiblock Additive (ppm) | Inner Layer (12.5%) | Core Layer (75%) | Outer Layer (12.5%) |
|---|---|---|---|---|---|---|---|
| Example 1 | | | | | | | |
| LDPE | 2.2 | 0.930 | 1000 | 10000 | 100 | 30 | 100 |
| LLDPE 1 | 3.5 | 0.923 | 2000 | 0 | | 70 | |
| Example 2 | | | | | | | |
| LDPE | 2.2 | 0.930 | 1000 | 10000 | 100 | 10 | 100 |
| LLDPE 1 | 3.5 | 0.923 | 2000 | | | 90 | |

| Polymer Resin | MI (g/10 min) | Density (g/cc) | Slip Additive (ppm) | Antiblock Additive (ppm) | Inner Layer (12.5%) | Core Layer (75%) | Outer Layer (12.5%) |
|---|---|---|---|---|---|---|---|
| Example 3 | | | | | | | |
| LDPE | 2.2 | 0.930 | 1000 | 10000 | 100 | 10 | 100 |
| mLLDPE 2 | 4.5 | 0.918 | | | | 70 | |
| HDPE | 8.0 | 0.962 | | | | 17 | |
| Slip Masterbatch | | | 50000 | | | 3 | |

Notes:
Slip additive and Antiblock additive amounts are in ppm by weight. Layer compositions are in wt. %.

TABLE III

Summary of Cast Film Properties - Examples 1-3

| Example | | 1 | 2 | 3 |
|---|---|---|---|---|
| Gauge | (mils) | 1.18 | 1.14 | 1.11 |
| Measured Dyne Level | (dyne/cm$^2$) | 38 | 38 | 37 |
| Haze | (%) | 6.3 | 6.0 | 5.2 |
| Gloss, 45° | | 77 | 76 | 81 |
| Gloss, 60° | | 119 | 119 | 127 |
| Dart Drop | (g/mil) | 70 | 80 | 130 |
| Elmendorf Tear, MD | (g/mil) | 130 | 145 | 190 |
| Elmendorf Tear, TD | (g/mil) | 500 | 540 | 540 |
| Puncture Propagation Tear, MD | (lb) | 5.7 | 5.9 | 7.0 |
| Puncture Propagation Tear, TD | (lb) | 6.8 | 6.9 | 7.6 |
| 1% Secant Modulus, MD | (kpsi) | 26 | 26 | 27 |
| 1% Secant Modulus, TD | (kpsi) | 27 | 28 | 27 |
| Tensile @ Yield, MD | (kpsi) | 2.26 | 2.01 | 1.95 |
| Tensile @ Yield, MD | (kpsi) | 2.90 | 3.06 | 4.03 |
| Tensile @ Break, MD | (kpsi) | 4.58 | 4.89 | 5.00 |
| Tensile @ Break, TD | (kpsi) | 2.90 | 3.06 | 4.03 |
| Elongation @ Break, MD | (%) | 411 | 457 | 500 |
| Elongation @ Break, TD | (%) | 647 | 652 | 601 |
| COF, treat/treat, kinetic | | 0.13 | 0.16 | 0.12 |
| COF, treat/treat, static | | 0.15 | 0.18 | 0.13 |
| Block Force, treat/treat @ 1 psi and 24 hr | | | | |
| Temp = 70° F. | (g) | 6.7 | 4.4 | 8.5 |
| Temp = 86° F. | (g) | 6.4 | 5.7 | 7.8 |
| Temp = 100° F. | (g) | 9.1 | 9.4 | 7.7 |
| Temp = 115° F. | (g) | 17.7 | 21.4 | 15.9 |
| Temp = 125° F. | (g) | 52.0 | 80.0 | 40.7 |
| Seal Initiation Temp (treat/treat) | (° C.) | 111 | 112 | 115 |
| Seal Strength (treat/treat) | (lbf/in) | 0.84 | 0.76 | 0.90 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A multilayer cast film comprising:
(a) a core layer having a first side and a second side, the core layer comprising an ethylene/α-olefin copolymer;
(b) an inner layer positioned on the first side of the core layer, the inner layer comprising a first low density polyethylene homopolymer; and
(c) an outer layer positioned on the second side of the core layer, the outer layer comprising a second low density polyethylene homopolymer;
wherein the ethylene/α-olefin copolymer is characterized by:
a melt index in a range from about 2 to about 12 g/10 min;
a density in a range from about 0.91 to about 0.95 g/cm$^3$; and
a ratio of Mw/Mn in a range from about 2 to about 3.5.

Aspect 2. The cast film defined in aspect 1, wherein the ethylene/α-olefin copolymer has a melt index (MI) in any range disclosed herein, e.g., from about 2 to about 8, from about 3 to about 6, from about 3 to about 5 g/10 min, etc.

Aspect 3. The cast film defined in aspect 1 or 2, wherein the ethylene/α-olefin copolymer has a density in any range disclosed herein, e.g., from about 0.91 to about 0.94, from about 0.91 to about 0.93, from about 0.915 to about 0.94, from about 0.915 to about 0.935, from about 0.915 to about 0.93 g/cm$^3$, etc.

Aspect 4. The cast film defined in any one of aspects 1-3, wherein the ethylene/α-olefin copolymer has a Mp in any range disclosed herein, e.g., from about 40,000 to about 100,000, from about 50,000 to about 90,000, from about 55,000 to about 85,000 g/mol, etc.

Aspect 5. The cast film defined in any one of aspects 1-4, wherein the ethylene/α-olefin copolymer has a Mw in any range disclosed herein, e.g., from about 65,000 to about 120,000, from about 70,000 to about 105,000, from about 70,000 to about 100,000 g/mol, etc.

Aspect 6. The cast film defined in any one of aspects 1-5, wherein the ethylene/α-olefin copolymer has a Mn in any range disclosed herein, e.g., from about 18,000 to about 55,000, from about 20,000 to about 50,000, from about 25,000 to about 50,000 g/mol, etc.

Aspect 7. The cast film defined in any one of aspects 1-6, wherein the ethylene/α-olefin copolymer has a Mz in any range disclosed herein, e.g., from about 100,000 to about 300,000, from about 100,000 to about 200,000, from about 125,000 to about 175,000 g/mol, etc.

Aspect 8. The cast film defined in any one of aspects 1-7, wherein the ethylene/α-olefin copolymer has a ratio of Mw/Mn in any range disclosed herein, e.g., from about 2 to about 3.2, from about 2.1 to about 3.5, from about 2 to about 3, from about 2 to about 2.8, from about 2.1 to about 3.3, etc.

Aspect 9. The cast film defined in any one of aspects 1-8, wherein the ethylene/α-olefin copolymer has a ratio of Mz/Mw in any range disclosed herein, e.g., from about 1.5 to about 2.5, from about 1.5 to about 2.2, from about 1.6 to about 2.4, etc.

Aspect 10. The cast film defined in any one of aspects 1-9, wherein the ethylene/α-olefin copolymer has an amount of hexane extractables in any range disclosed herein, e.g., less than or equal to about 2 wt. %, less than or equal to about 1.5 wt. %, less than or equal to about 1 wt. %, etc.

Aspect 11. The cast film defined in any one of aspects 1-10, wherein the ethylene/α-olefin copolymer has an amount of xylene solubles in any range disclosed herein, e.g., less than or equal to about 5 wt. %, less than or equal to about 2 wt. %, less than or equal to about 1 wt. %, etc.

Aspect 12. The cast film defined in any one of aspects 1-11, wherein the ethylene/α-olefin copolymer has a unimodal molecular weight distribution.

Aspect 13. The cast film defined in any one of aspects 1-12, wherein the ethylene/α-olefin copolymer comprises an ethylene/1-butene copolymer, an ethylene/1-hexene copolymer, an ethylene/1-octene copolymer, or a combination thereof.

Aspect 14. The cast film defined in any one of aspects 1-13, wherein the core layer comprises any amount of the ethylene/α-olefin copolymer disclosed herein, e.g., greater than or equal to about 40 wt. %, greater than or equal to about 60 wt. %, greater than or equal to about 70 wt. %, greater than or equal to about 90 wt. %, greater than or equal to about 95 wt. %, etc., based on the total weight of the core layer.

Aspect 15. The cast film defined in any one of aspects 1-14, wherein the core layer (and/or the inner layer, and/or the outer layer) further comprises a second ethylene polymer, e.g., a HDPE, a LLDPE, a LDPE, etc., or combinations thereof.

Aspect 16. The cast film defined in any one of aspects 1-15, wherein the first low density polyethylene homopolymer and the second low density polyethylene homopolymer, independently, have a melt index (MI) in any range disclosed herein, e.g., from about 1 to about 8, from about 1.5 to about 6, from about 1.8 to about 5 g/10 min, etc.

Aspect 17. The cast film defined in any one of aspects 1-16, wherein the first low density polyethylene homopolymer and the second low density polyethylene homopolymer, independently, have a density in any range disclosed herein, e.g., from about 0.91 to about 0.94, from about 0.915 to about 0.935, from about 0.92 to about 0.935, from about 0.925 to about 0.932 g/cm$^3$, etc.

Aspect 18. The cast film defined in any one of aspects 1-17, wherein the first low density polyethylene homopolymer and the second low density polyethylene homopolymer comprise the same polymer.

Aspect 19. The cast film defined in any one of aspects 1-18, wherein the inner layer and the outer layer have the same composition (e.g., same polymer or blend of polymers).

Aspect 20. The cast film defined in any one of aspects 1-18, wherein the inner layer and the outer layer have different compositions (e.g., different polymer or different blend of polymers).

Aspect 21. The cast film defined in any one of aspects 1-20, wherein the inner layer comprises any amount of the first low density polyethylene homopolymer disclosed herein, e.g., greater than or equal to about 60 wt. %, greater than or equal to about 80 wt. %, greater than or equal to about 90 wt. %, greater than or equal to about 95 wt. %, greater than or equal to about 99 wt. %, etc., based on the total weight of the inner layer.

Aspect 22. The cast film defined in any one of aspects 1-21, wherein the outer layer comprises any amount of the second low density polyethylene homopolymer disclosed herein, e.g., greater than or equal to about 60 wt. %, greater than or equal to about 80 wt. %, greater than or equal to about 90 wt. %, greater than or equal to about 95 wt. %, greater than or equal to about 99 wt. %, etc., based on the total weight of the outer layer.

Aspect 23. The cast film defined in any one of aspects 1-18, wherein the inner layer comprises a blend of the first low density polyethylene homopolymer and a first medium density ethylene/α-olefin copolymer characterized by a melt index in a range from about 2 to about 12 g/10 min, a density in a range from about 0.925 to about 0.94 g/cm$^3$, and a ratio of Mw/Mn in a range from about 2 to about 3.5.

Aspect 24. The cast film defined in aspect 23, wherein the weight ratio of the first low density polyethylene homopolymer to the first medium density ethylene/α-olefin copolymer in the inner layer is in any range disclosed herein, e.g., from about 10:90 to about 90:10, from about 15:85 to about 85:15, from about 25:75 to about 75:25, from about 40:60 to about 60:40, etc.

Aspect 25. The cast film defined in any one of aspects 1-18 or 23-24, wherein the outer layer comprises a blend of the second low density polyethylene homopolymer and a second medium density ethylene/α-olefin copolymer characterized by a melt index in a range from about 2 to about 12 g/10 min, a density in a range from about 0.925 to about 0.94 g/cm$^3$, and a ratio of Mw/Mn in a range from about 2 to about 3.5.

Aspect 26. The cast film defined in aspect 25, wherein the weight ratio of the second low density polyethylene homopolymer to the second medium density ethylene/α-olefin copolymer in the outer layer is in any range disclosed herein, e.g., from about 10:90 to about 90:10, from about 15:85 to about 85:15, from about 25:75 to about 75:25, from about 40:60 to about 60:40, etc.

Aspect 27. The cast film defined in any one of aspects 23-26, wherein the first medium density ethylene/α-olefin copolymer and the second medium density ethylene/α-olefin copolymer, independently, have a melt index (MI) in any range disclosed herein, e.g., from about 2 to about 8, from about 2 to about 6, from about 2.5 to about 5 g/10 min, etc.

Aspect 28. The cast film defined in any one of aspects 23-27, wherein the first medium density ethylene/α-olefin copolymer and the second medium density ethylene/α-olefin copolymer, independently, have a density in any range disclosed herein, e.g., from about 0.928 to about 0.938, from about 0.93 to about 0.94, from about 0.93 to about 0.936 g/cm$^3$, etc.

Aspect 29. The cast film defined in any one of aspects 23-28, wherein the first medium density ethylene/α-olefin copolymer and the second medium density ethylene/α-olefin copolymer, independently, have a ratio of Mw/Mn in any range disclosed herein, e.g., from about 2 to about 3.2, from about 2.1 to about 3.5, from about 2 to about 3, from about 2 to about 2.8, from about 2.1 to about 3.3, etc.

Aspect 30. The cast film defined in any one of aspects 23-29, wherein the first medium density ethylene/α-olefin copolymer and the second medium density ethylene/α-olefin copolymer comprise the same polymer.

Aspect 31. The cast film defined in any one of aspects 23-30, wherein the inner layer and the outer layer have the same composition (e.g., same blend of polymers).

Aspect 32. The cast film defined in any one of aspects 23-30, wherein the inner layer and the outer layer have different compositions (e.g., different blend of polymers).

Aspect 33. The cast film defined in any one of aspects 1-32, wherein the cast film has an average thickness in any range disclosed herein, e.g., from about 0.5 to about 5, from about 0.6 to about 2.5, from about 0.7 to about 2, from about 0.8 to 1.5 mils, etc.

Aspect 34. The cast film defined in any one of aspects 1-33, wherein the outer layer is any (average) percentage of the total thickness of the cast film disclosed herein, e.g., from about 6% to about 25%, from about 8% to about 25%, from about 8% to about 20%, from about 10% to about 15%, etc.

Aspect 35. The cast film defined in any one of aspects 1-34, wherein the inner layer is any (average) percentage of the total thickness of the cast film disclosed herein, e.g., from about 6% to about 25%, from about 8% to about 25%, from about 8% to about 20%, from about 10% to about 15%, etc.

Aspect 36. The cast film defined in any one of aspects 1-35, wherein the core layer is any (average) percentage of the total thickness of the cast film disclosed herein, e.g., from about 50% to about 90%, from about 65% to about 85%, from about 65% to about 80%, from about 70% to about 80%, etc.

Aspect 37. The cast film defined in any one of aspects 1-36, wherein the cast film has a blocking force at 125° F. in any range disclosed herein, e.g., less than or equal to about 60 g, less than or equal to about 50 g, less than or equal to about 47 g, less than or equal to about 45 g, less than or equal to about 42 g, etc.

Aspect 38. The cast film defined in any one of aspects 1-37, wherein the cast film has a blocking force at 125° F. that is less, by any amount disclosed herein, than that of a multilayer cast film containing an otherwise identical ethylene/α-olefin copolymer (same melt index, density, and additives) in the core layer, but having a ratio of Mw/Mn that is greater than or equal to 4.

Aspect 39. The cast film defined in any one of aspects 1-38, wherein the cast film has a dart impact strength in any range disclosed herein, e.g., from about 80 to about 300, from about 90 to about 250, from about 90 to about 200, from about 100 to about 175 g/mil, etc.

Aspect 40. The cast film defined in any one of aspects 1-39, wherein the cast film has a haze in any range disclosed herein, e.g., from about 2 to about 8%, from about 3 to about 7%, from about 3 to about 6%, from about 4 to about 6%, etc.

Aspect 41. The cast film defined in any one of aspects 1-40, wherein the cast film has a MD Elmendorf tear strength in any range disclosed herein, e.g., from about 130 to about 300, from about 150 to about 300, from about 150 to about 250 g/mil, etc.

Aspect 42. The cast film defined in any one of aspects 1-41, wherein the cast film has a kinetic COF in any range disclosed herein, e.g., less than or equal to about 0.2, less than or equal to about 0.18, less than or equal to about 0.15, etc.

Aspect 43. The cast film defined in any one of aspects 1-42, wherein the cast film further comprises any additive disclosed herein, e.g., an antioxidant, an acid scavenger, an antiblock additive, a slip additive, a colorant, a filler, a polymer processing aid, a UV inhibitor, etc., or combinations thereof.

Aspect 44. The cast film defined in any one of aspects 1-43, wherein the inner layer is adjacent the first side of the core layer, and the outer layer is adjacent the second side of the core layer.

Aspect 45. The cast film defined in any one of aspects 1-43, wherein a first intermediate layer is (or one or more first intermediate layers are) positioned between the inner layer and the core layer, and a second intermediate layer is (or one or more second intermediate layers are) positioned between the outer layer and the core layer.

Aspect 46. An article comprising the cast film defined in any one of aspects 1-45, wherein the article is a printed bakery or bread bag.

Aspect 47. A process for producing a multilayer cast film having a reduced blocking force, the process comprising:

(i) introducing a coextruded flow into a cast film coextrusion die, the coextruded flow comprising:
  (a) a core layer flow having a first side and a second side, the core layer flow comprising an ethylene/α-olefin copolymer;
  (b) an inner layer flow positioned on the first side of the core layer flow, the inner layer flow comprising a first low density polyethylene homopolymer; and
  (c) an outer layer flow positioned on the second side of the core layer flow, the outer layer flow comprising a second low density polyethylene homopolymer; and (ii) drawing down the coextruded flow exiting the cast film coextrusion die to produce the multilayer cast film; wherein:

the ethylene/α-olefin copolymer is characterized by:
  a melt index in a range from about 2 to about 12 g/10 min;
  a density in a range from about 0.91 to about 0.95 g/cm$^3$; and
  a ratio of Mw/Mn in a range from about 2 to about 3.5; and the cast film has a blocking force at 125° F. of less than or equal to about 60 g.

Aspect 48. The process defined in aspect 47, wherein the cast film has a blocking force at 125° F. that is less, by any amount disclosed herein, than that of a multilayer cast film produced using an otherwise identical ethylene/α-olefin copolymer (same melt index, density, and additives) in the core layer flow, but having a ratio of Mw/Mn that is greater than or equal to 4.

Aspect 49. A multilayer cast film comprising:
(A) a core layer having a first side and a second side, the core layer comprising an ethylene polymer;
(B) an inner layer positioned on the first side of the core layer, the inner layer comprising a first ethylene/α-olefin copolymer; and
(C) an outer layer positioned on the second side of the core layer, the outer layer comprising a second ethylene/α-olefin copolymer;

wherein the first ethylene/α-olefin copolymer and the second ethylene/α-olefin copolymer are the same or different, and are characterized by:
  a melt index in a range from about 0.5 to about 12 g/10 min;

a density in a range from about 0.925 to about 0.94 g/cm$^3$; and a ratio of Mw/Mn in a range from about 2 to about 3.5.

Aspect 50. The cast film defined in aspect 49, wherein the first ethylene/α-olefin copolymer and the second ethylene/α-olefin copolymer, independently, have a melt index (MI) in any range disclosed herein, e.g., from about 2 to about 8, from about 3 to about 6, from about 3 to about 5 g/10 min, etc.

Aspect 51. The cast film defined in aspect 49 or 50, wherein the first ethylene/α-olefin copolymer and the second ethylene/α-olefin copolymer, independently, have a density in any range disclosed herein, e.g., from about 0.928 to about 0.94, from about 0.928 to about 0.938, from about 0.93 to about 0.94, from about 0.93 to about 0.938 g/cm$^3$, etc.

Aspect 52. The cast film defined in any one of aspects 49-51, wherein the first ethylene/α-olefin copolymer and the second ethylene/α-olefin copolymer, independently, have a Mp in any range disclosed herein, e.g., from about 40,000 to about 100,000, from about 50,000 to about 90,000, from about 55,000 to about 85,000 g/mol, etc.

Aspect 53. The cast film defined in any one of aspects 49-52, wherein the first ethylene/α-olefin copolymer and the second ethylene/α-olefin copolymer, independently, have a Mw in any range disclosed herein, e.g., from about 65,000 to about 120,000, from about 70,000 to about 105,000, from about 70,000 to about 100,000 g/mol, etc.

Aspect 54. The cast film defined in any one of aspects 49-53, wherein the first ethylene/α-olefin copolymer and the second ethylene/α-olefin copolymer, independently, have a Mn in any range disclosed herein, e.g., from about 18,000 to about 55,000, from about 20,000 to about 50,000, from about 25,000 to about 50,000 g/mol, etc.

Aspect 55. The cast film defined in any one of aspects 49-54, wherein the first ethylene/α-olefin copolymer and the second ethylene/α-olefin copolymer, independently, have a Mz in any range disclosed herein, e.g., from about 100,000 to about 300,000, from about 100,000 to about 200,000, from about 125,000 to about 175,000 g/mol, etc.

Aspect 56. The cast film defined in any one of aspects 49-55, wherein the first ethylene/α-olefin copolymer and the second ethylene/α-olefin copolymer, independently, have a ratio of Mw/Mn in any range disclosed herein, e.g., from about 2 to about 3.2, from about 2.1 to about 3.5, from about 2 to about 3, from about 2 to about 2.8, from about 2.1 to about 3.3, etc.

Aspect 57. The cast film defined in any one of aspects 49-56, wherein the first ethylene/α-olefin copolymer and the second ethylene/α-olefin copolymer, independently, have a ratio of Mz/Mw in any range disclosed herein, e.g., from about 1.5 to about 2.5, from about 1.5 to about 2.2, from about 1.6 to about 2.4, etc.

Aspect 58. The cast film defined in any one of aspects 49-57, wherein the first ethylene/α-olefin copolymer and the second ethylene/α-olefin copolymer, independently, have an amount of hexane extractables in any range disclosed herein, e.g., less than or equal to about 2 wt. %, less than or equal to about 1.5 wt. %, less than or equal to about 1 wt. %, etc.

Aspect 59. The cast film defined in any one of aspects 49-58, wherein the first ethylene/α-olefin copolymer and the second ethylene/α-olefin copolymer, independently, have an amount of xylene solubles in any range disclosed herein, e.g., less than or equal to about 5 wt. %, less than or equal to about 2 wt. %, less than or equal to about 1 wt. %, etc.

Aspect 60. The cast film defined in any one of aspects 49-59, wherein the first ethylene/α-olefin copolymer and the second ethylene/α-olefin copolymer have a unimodal molecular weight distribution.

Aspect 61. The cast film defined in any one of aspects 49-60, wherein the first ethylene/α-olefin copolymer and the second ethylene/α-olefin copolymer, independently, comprise an ethylene/1-butene copolymer, an ethylene/1-hexene copolymer, an ethylene/1-octene copolymer, or a combination thereof.

Aspect 62. The cast film defined in any one of aspects 49-61, wherein the inner layer comprises any amount of the first ethylene/α-olefin copolymer disclosed herein, e.g., greater than or equal to about 10 wt. %, greater than or equal to about 20 wt. %, greater than or equal to about 40 wt. %, greater than or equal to about 75 wt. %, greater than or equal to about 90 wt. %, etc., based on the total weight of the inner layer.

Aspect 63. The cast film defined in any one of aspects 49-62, wherein the outer layer comprises any amount of the second ethylene/α-olefin copolymer disclosed herein, e.g., greater than or equal to about 10 wt. %, greater than or equal to about 20 wt. %, greater than or equal to about 40 wt. %, greater than or equal to about 75 wt. %, greater than or equal to about 90 wt. %, etc., based on the total weight of the outer layer.

Aspect 64. The cast film defined in any one of aspects 49-63, wherein the first ethylene/α-olefin copolymer and the second ethylene/α-olefin copolymer comprise the same polymer.

Aspect 65. The cast film defined in any one of aspects 49-64, wherein the inner layer comprises a blend of the first ethylene/α-olefin copolymer and a first low density polyethylene homopolymer.

Aspect 66. The cast film defined in aspect 65, wherein the weight ratio of the first ethylene/α-olefin copolymer to the first low density polyethylene homopolymer in the inner layer is in any range disclosed herein, e.g., from about 10:90 to about 90:10, from about 15:85 to about 85:15, from about 25:75 to about 75:25, from about 40:60 to about 60:40, etc.

Aspect 67. The cast film defined in any one of aspects 49-66, wherein the outer layer comprises a blend of the second ethylene/α-olefin copolymer and a second low density polyethylene homopolymer.

Aspect 68. The cast film defined in aspect 67, wherein the weight ratio of the second ethylene/α-olefin copolymer to the second low density polyethylene homopolymer in the outer layer is in any range disclosed herein, e.g., from about 10:90 to about 90:10, from about 15:85 to about 85:15, from about 25:75 to about 75:25, from about 40:60 to about 60:40, etc.

Aspect 69. The cast film defined in any one of aspects 65-68, wherein the first low density polyethylene homopolymer and the second low density polyethylene homopolymer, independently, have a melt index (MI) in any range disclosed herein, e.g., from about 1 to about 8, from about 1.5 to about 6, from about 1.8 to about 5 g/10 min, etc.

Aspect 70. The cast film defined in any one of aspects 65-69, wherein the first low density polyethylene homopolymer and the second low density polyethylene homopolymer, independently, have a density in any range disclosed herein, e.g., from about 0.91 to about 0.94, from about 0.915 to about 0.935, from about 0.92 to about 0.935, from about 0.922 to about 0.932 g/cm$^3$, etc.

Aspect 71. The cast film defined in any one of aspects 65-70, wherein the first low density polyethylene homopolymer and the second low density polyethylene homopolymer comprise the same polymer.

Aspect 72. The cast film defined in any one of aspects 49-71, wherein the inner layer and the outer layer have the same composition (e.g., same polymer or blend of polymers).

Aspect 73. The cast film defined in any one of aspects 49-71, wherein the inner layer and the outer layer have different compositions (e.g., different polymer or different blend of polymers).

Aspect 74. The cast film defined in any one of aspects 49-73, wherein the ethylene polymer comprises a HDPE, a LLDPE, or a LDPE.

Aspect 75. The cast film defined in any one of aspects 49-74, wherein the core layer further comprises a second ethylene polymer, e.g., a HDPE, a LLDPE, a LDPE, etc., or combinations thereof.

Aspect 76. The cast film defined in any one of aspects 49-75, wherein the core layer comprises a blend of a LDPE homopolymer and a LLDPE copolymer.

Aspect 77. The cast film defined in aspect 76, wherein the weight ratio of the LDPE homopolymer to the LLDPE copolymer in the core layer is in any range disclosed herein, e.g., from about 10:90 to about 90:10, from about 15:85 to about 85:15, from about 25:75 to about 75:25, from about 40:60 to about 60:40, etc.

Aspect 78. The cast film defined in any one of aspects 49-77, wherein the cast film has an average thickness in any range disclosed herein, e.g., from about 0.5 to about 5, from about 0.6 to about 2.5, from about 0.7 to about 2, from about 0.8 to 1.5 mils, etc.

Aspect 79. The cast film defined in any one of aspects 49-78, wherein the outer layer is any (average) percentage of the total thickness of the cast film disclosed herein, e.g., from about 6% to about 25%, from about 8% to about 25%, from about 8% to about 20%, from about 10% to about 15%, etc.

Aspect 80. The cast film defined in any one of aspects 49-79, wherein the inner layer is any (average) percentage of the total thickness of the cast film disclosed herein, e.g., from about 6% to about 25%, from about 8% to about 25%, from about 8% to about 20%, from about 10% to about 15%, etc.

Aspect 81. The cast film defined in any one of aspects 49-80, wherein the core layer is any (average) percentage of the total thickness of the cast film disclosed herein, e.g., from about 50% to about 90%, from about 65% to about 85%, from about 65% to about 80%, from about 70% to about 80%, etc.

Aspect 82. The cast film defined in any one of aspects 49-81, wherein the cast film has a blocking force at 125° F. in any range disclosed herein, e.g., less than or equal to about 60 g, less than or equal to about 50 g, less than or equal to about 47 g, less than or equal to about 45 g, less than or equal to about 42 g, etc.

Aspect 83. The cast film defined in any one of aspects 49-82, wherein the cast film has a dart impact strength in any range disclosed herein, e.g., from about 80 to about 300, from about 90 to about 250, from about 90 to about 200, from about 100 to about 175 g/mil, etc.

Aspect 84. The cast film defined in any one of aspects 49-83, wherein the cast film has a haze in any range disclosed herein, e.g., from about 2 to about 8%, from about 3 to about 7%, from about 3 to about 6%, from about 4 to about 6%, etc.

Aspect 85. The cast film defined in any one of aspects 49-84, wherein the cast film has a MID Elmendorf tear strength in any range disclosed herein, e.g., from about 130 to about 300, from about 150 to about 300, from about 150 to about 250 g/mil, etc.

Aspect 86. The cast film defined in any one of aspects 49-85, wherein the cast film has a kinetic COF in any range disclosed herein, e.g., less than or equal to about 0.2, less than or equal to about 0.18, less than or equal to about 0.15, etc.

Aspect 87. The cast film defined in any one of aspects 49-86, wherein the cast film further comprises any additive disclosed herein, e.g., an antioxidant, an acid scavenger, an antiblock additive, a slip additive, a colorant, a filler, a polymer processing aid, a UV inhibitor, etc., or combinations thereof.

Aspect 88. The cast film defined in any one of aspects 49-87, wherein the inner layer is adjacent the first side of the core layer, and the outer layer is adjacent the second side of the core layer.

Aspect 89. The cast film defined in any one of aspects 49-87, wherein a first intermediate layer is (or one or more first intermediate layers are) positioned between the inner layer and the core layer, and a second intermediate layer is (or one or more second intermediate layers are) positioned between the outer layer and the core layer.

Aspect 90. An article comprising the cast film defined in any one of aspects 49-89, wherein the article is a printed bakery or bread bag.

Aspect 91. A process for producing a multilayer cast film having a reduced blocking force, the process comprising:
 (i) introducing a coextruded flow into a cast film coextrusion die, the coextruded flow comprising:
  (a) a core layer flow having a first side and a second side, the core layer flow comprising an ethylene polymer;
  (b) an inner layer flow positioned on the first side of the core layer flow, the inner layer flow comprising a first ethylene/α-olefin copolymer; and
  (c) an outer layer flow positioned on the second side of the core layer flow, the outer layer flow comprising a second ethylene/α-olefin copolymer; and
 (ii) drawing down the coextruded flow exiting the cast film coextrusion die to produce the multilayer cast film;
wherein:
 the first ethylene/α-olefin copolymer and the second ethylene/α-olefin copolymer are the same or different, and are characterized by:
  a melt index in a range from about 0.5 to about 12 g/10 min;
  a density in a range from about 0.925 to about 0.94 g/cm$^3$; and
  a ratio of Mw/Mn in a range from about 2 to about 3.5; and
 the cast film has a blocking force at 125° F. of less than or equal to about 60 g.

We claim:

1. An article of manufacture comprising a multilayer cast film, wherein the article is a printed bakery or bread bag, and wherein the multilayer cast film comprises:
 (a) a core layer having a first side and a second side, the core layer comprising an ethylene/1-hexene copolymer;
 (b) an inner layer positioned on the first side of the core layer, the inner layer comprising a first low density polyethylene homopolymer; and
 (c) an outer layer positioned on the second side of the core layer, the outer layer comprising a second low density polyethylene homopolymer;

wherein the ethylene/1-hexene copolymer is characterized by:
a melt index in a range from about 2 to about 12 g/10 min;
a density in a range from about 0.91 to about 0.95 g/cm$^3$;
a Mz in a range from about 100,000 to about 200,000 g/mol; and
a ratio of Mw/Mn in a range from about 2 to about 3.5; and
a combined haze of the inner layer, the core layer and the outer layer of the multilayer cast film is in a range from 2 to 6%, and a blocking force at 125° F. of the multilayer cast film is less than or equal to about 50 g.

2. The cast film article of claim 1, wherein:
the melt index is in a range from about 2 to about 8 g/10 min;
the density is in a range from about 0.91 to about 0.94 g/cm$^3$;
the Mz is in a range from about 125,000 to about 175,000 g/mol;
the ratio of Mw/Mn is in a range from about 2 to about 3;
the core layer comprises greater than or equal to about 60 wt. % of the ethylene/1-hexene copolymer;
the ethylene/1-hexene copolymer is further characterized by a ratio of Mz/Mw in a range from about 1.6 to about 2.4.

3. The article of claim 1, wherein:
the first low density polyethylene homopolymer has a melt index in a range from about 1.5 to about 6 g/10 min and a density in a range from about 0.925 to about 0.932 g/cm$^3$;
the second low density polyethylene homopolymer has a melt index in a range from about 1.5 to about 6 g/10 min and a density in a range from about 0.925 to about 0.932 g/cm$^3$; and
the ethylene/1-hexene copolymer is characterized by:
a melt index in a range from about 3 to about 6 g/10 min;
a density in a range from about 0.915 to about 0.935 g/cm$^3$; and
a ratio of Mw/Mn in a range from about 2 to about 3.

4. The article of claim 1, wherein:
the cast film has an average thickness in a range from about 0.6 to about 2.5 mils; and
the haze is in a range from about 3 to 6%.

5. The article of claim 1, wherein the cast film further comprises an additive selected from an antioxidant, an acid scavenger, an antiblock additive, a slip additive, a colorant, a filler, a polymer processing aid, a UV inhibitor, or any combination thereof.

6. The article of claim 5, wherein:
the core layer comprises greater than or equal to about 60 wt. % of the ethylene/1-hexene copolymer;
the inner layer comprises greater than or equal to about 80 wt. % of the first low density polyethylene homopolymer; and
the outer layer comprises greater than or equal to about 80 wt. % of the second low density polyethylene homopolymer.

7. The article of claim 5, wherein the ethylene/1-hexene copolymer is further characterized by:
a ratio of Mz/Mw in a range from about 1.6 to about 2.4;
a Mp in a range from about 55,000 to about 85,000 g/mol;
less than or equal to about 1.5 wt. % of hexane extractables; and
less than or equal to about 2 wt. % of xylene solubles.

8. The article of claim 5, wherein the cast film is further characterized by:
a dart impact strength in a range from about 90 to about 250 g/mil;
a MD Elmendorf tear strength in a range from about 150 to about 300 g/mil; and
an outer layer kinetic COF of less than or equal to about 0.2.

9. The article of claim 5, wherein:
the cast film has an average thickness in a range from about 0.6 to about 2.5 mils;
the outer layer comprises, on average, from about 8% to about 20% of the average thickness; and
the inner layer comprises, on average, from about 8% to about 20% of the average thickness.

10. The article of claim 5, wherein the inner layer is adjacent the first side of the core layer, and the outer layer is adjacent the second side of the core layer.

11. The article of claim 8, wherein the ethylene/1-hexene copolymer is further characterized by a Mp in a range from about 55,000 to about 85,000 g/mol.

* * * * *